United States Patent
Alft et al.

(12)

(10) Patent No.: US 6,389,360 B1
(45) Date of Patent: May 14, 2002

(54) AUTOMATED BORE PLANNING METHOD AND APPARATUS FOR HORIZONTAL DIRECTIONAL DRILLING

(75) Inventors: Kevin L. Alft, Pella, IA (US); Fred G. Delonti, Asheville, NC (US); Christopher Dean Rettig, Pella; Paul A. Cartwright, Ottumwa, both of IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 09/482,288

(22) Filed: Jan. 13, 2000

Related U.S. Application Data

(60) Provisional application No. 60/115,880, filed on Jan. 13, 1999.

(51) Int. Cl.[7] ............................................... G01V 3/18
(52) U.S. Cl. ................................................. 702/9
(58) Field of Search ......................... 702/9; 33/304; 175/45

(56) References Cited

U.S. PATENT DOCUMENTS

| 4,598,585 A | 7/1986 | Boxenhorn |
| 4,907,658 A | 3/1990 | Stangl et al. |
| 4,926,696 A | 5/1990 | Haritonidis et al. |
| 4,945,765 A | 8/1990 | Roszhart |
| 4,996,627 A | 2/1991 | Zias et al. |

(List continued on next page.)

OTHER PUBLICATIONS

"Drill Path," Infrasoft, LLC., Computer Software for Solving Infrastructure Problems, 2916 West T.C. Jester, Houston, Texas 77018, 20 pages.

"Subsite Electronices Trac Management System," Subsite Electronics a Division of the Charles Machine Works, Inc. 1950 West Fir Avenue, Perry, Oklahoma 73077, Feb. 1998.

H. Hodgson, Computerized Well Planning for Directional Wells, SPE, No. 12071, Oct. 8, 1983, pp. 1–6.

O.L.A. Santos, The Development and Field Application of a 3D Computer Graphics System for Displaying Wellbore Trajectories, SPE, No. 29197, Nov. 10, 1994, pp. 371–382.

*Primary Examiner*—Donald E. McElheny, Jr.
(74) *Attorney, Agent, or Firm*—Altera Law Group LLC

(57) ABSTRACT

A system, method, and computer-readable media provide for electronic development of a bore plan for use in connection with an underground boring machine. Electronically developing a bore plan involves receiving topographical information representative of topography of the bore site, receiving utility information representative of one or more utilities situated at the bore site, and receiving bore path information representative of an intended bore path at the bore site. A bore plan data is generated using the received topographic, utility, and bore path information. The bore plan data includes data representative of an intended bore defined along the intended bore path and with respect to the representative topography at the bore site. The topographical en information representative of the bore site topography may be received as two-dimensional data or three-dimensional data. A user-interface permits user alteration of one or more of topographic data, utility data, bore path data, and other bore plan data. A user may also alter the graphical representations of a selected utility, topographic or bore path element. Data corresponding to the selected utility, topographic or bore path element may be displayed while graphically altering the B graphical representation of the selected utility, topographic or bore path element. A selected bore plan report or graph, a minimum ground cover report or graph, a sonde information report or graph, or a warnings/errors report or graph may be displayed or otherwise produced.

94 Claims, 24 Drawing Sheets

U.S. PATENT DOCUMENTS

| | | |
|---|---|---|
| 5,090,254 A | 2/1992 | Guckel et al. |
| 5,103,920 A | 4/1992 | Patton |
| 5,188,983 A | 2/1993 | Guckel et al. |
| 5,189,777 A | 3/1993 | Guckel et al. |
| 5,233,871 A | 8/1993 | Schwarz et al. |
| 5,332,469 A | 7/1994 | Mastrangelo |
| 5,337,002 A | 8/1994 | Mercer |
| 5,338,929 A | 8/1994 | Douma et al. |
| 5,392,650 A | 2/1995 | O'Brien et al. |
| 5,456,110 A | 10/1995 | Hulsing, II |
| 5,469,155 A | 11/1995 | Archambeault et al. |
| 5,515,724 A | 5/1996 | Greiff et al. |
| 5,556,253 A | 9/1996 | Rozendaal et al. |
| 5,585,726 A | 12/1996 | Chau |
| 5,627,314 A | 5/1997 | Hulsing, II |
| 5,633,589 A | 5/1997 | Mercer |
| 5,656,777 A | 8/1997 | Petri et al. |
| 5,659,195 A | 8/1997 | Kaiser et al. |
| 5,668,319 A | 9/1997 | Garabedian |
| 5,698,981 A | 12/1997 | Mercer |
| 5,711,381 A | 1/1998 | Archambeault et al. |
| 5,720,354 A | 2/1998 | Stump et al. |
| 5,739,431 A | 4/1998 | Petri |
| 5,746,278 A | 5/1998 | Bischel et al. |
| 5,756,895 A | 5/1998 | Kubena et al. |
| 5,757,320 A | 5/1998 | McEwan |
| 5,760,305 A | 6/1998 | Greiff |
| 5,764,062 A | 6/1998 | Mercer |
| 5,767,405 A | 6/1998 | Bernstein et al. |
| 5,767,678 A | 6/1998 | Mercer |
| 5,774,091 A | 6/1998 | McEwan |
| 5,780,742 A | 7/1998 | Burns et al. |
| 5,796,001 A | 8/1998 | Greiff et al. |
| 5,805,110 A | 9/1998 | McEwan |
| 5,817,942 A | 10/1998 | Greiff |
| 5,818,227 A | 10/1998 | Payne et al. |
| 5,825,660 A | 10/1998 | Cagan et al. |
| 5,831,164 A | 11/1998 | Reddi et al. |
| 5,867,117 A | 2/1999 | Gogineni et al. |
| 5,869,760 A | 2/1999 | Geen |
| 5,886,249 A | 3/1999 | Bonne et al. |
| 5,904,210 A | 5/1999 | Stump et al. |
| 5,915,275 A | 6/1999 | Cardarelli et al. |
| 6,035,951 A | 3/2000 | Mercer et al. |

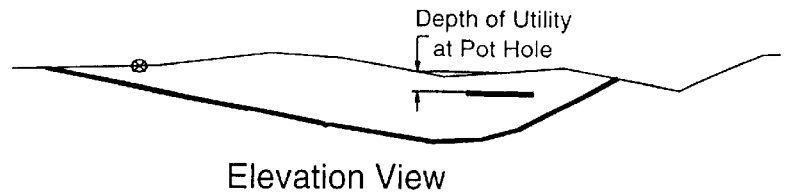
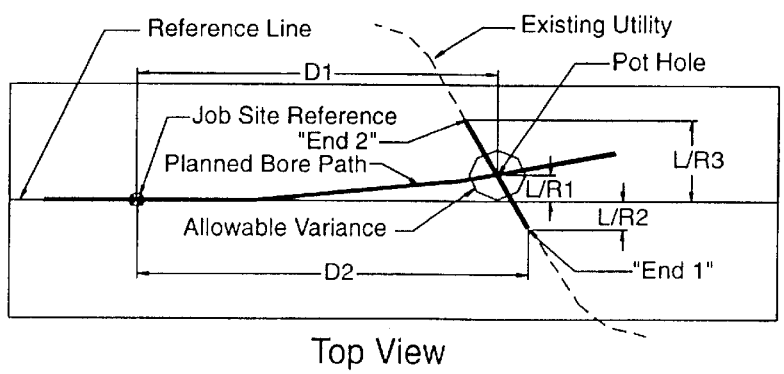
Fig. 21A
Fig. 21B
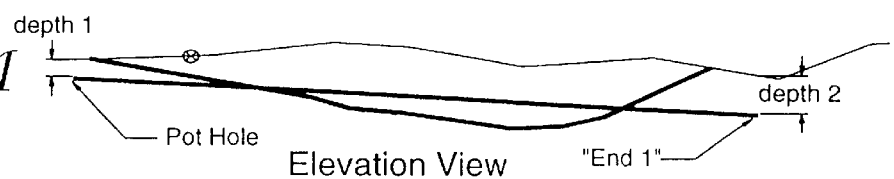
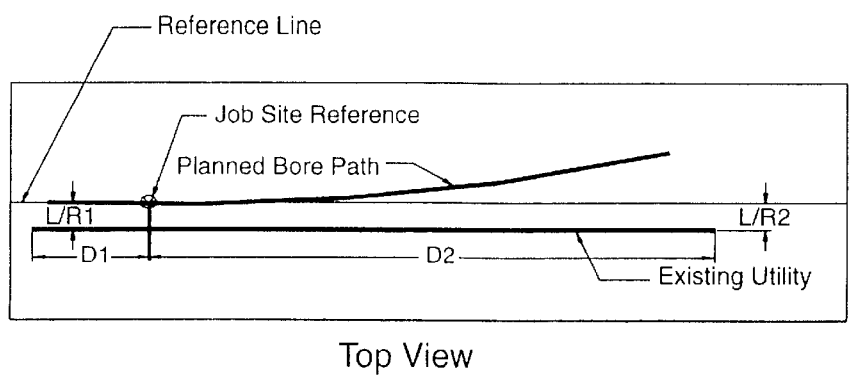
Fig. 22A
Fig. 22B

- ● destination target (end2)
- • moving target (end1)
- □ control point

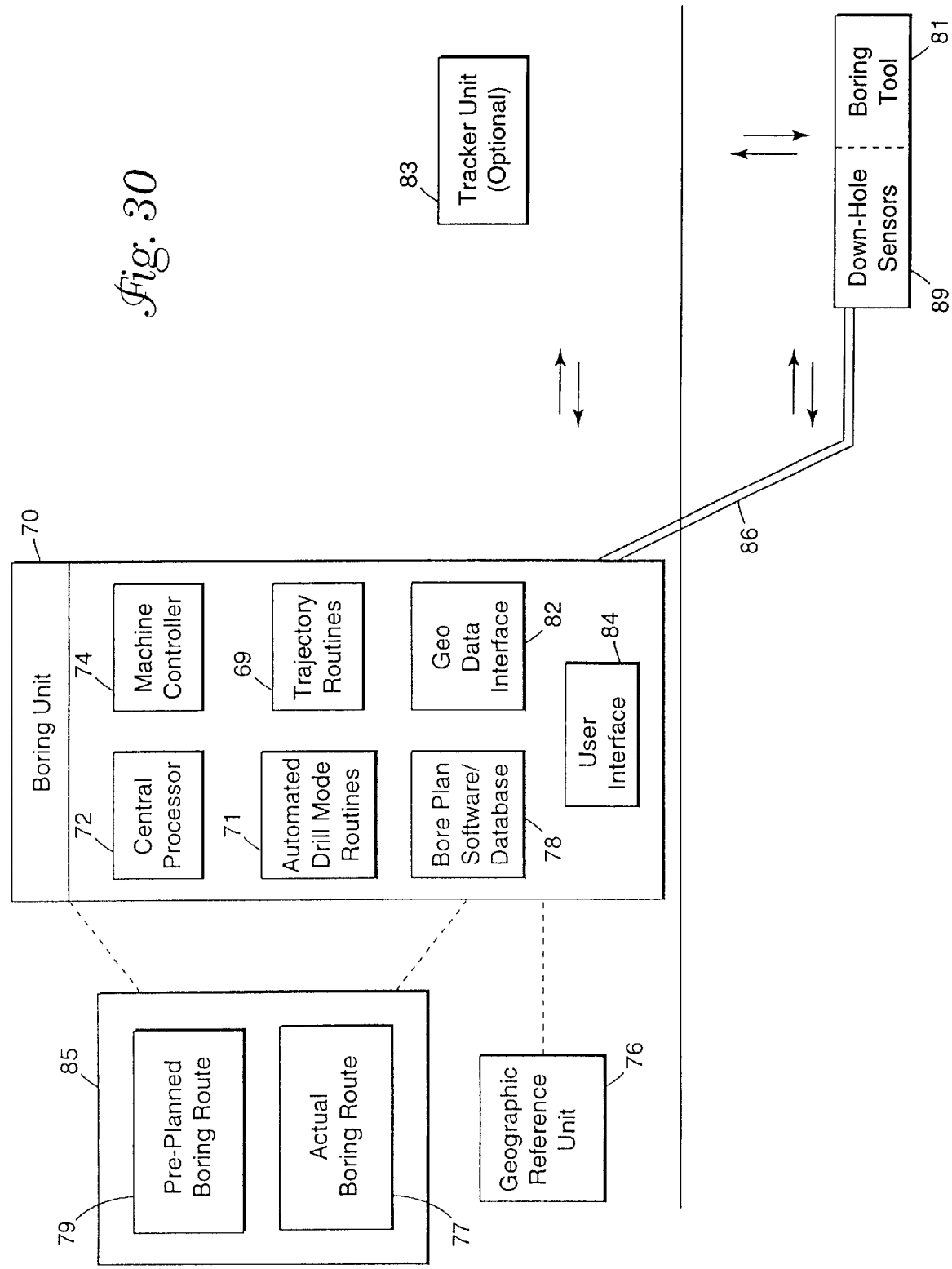

AUTOMATED BORE PLANNING METHOD AND APPARATUS FOR HORIZONTAL DIRECTIONAL DRILLING

RELATED APPLICATIONS

This application claims the benefit of U.S. Provisional Application No. 60/115,880, filed Jan. 13, 1999, which is hereby incorporated by reference in its entirety.

BACKGROUND OF THE INVENTION

The present invention relates generally to the field of underground boring and, more particularly, to a method and apparatus for planning and adjusting a bore plan, prior to and during an actual boring operation.

Utility lines for water, electricity, gas, telephone and cable television are often run underground for reasons of safety and aesthetics. In many situations, the underground utilities can be buried in a trench which is then back-filled. Although useful in areas of new construction, the burial of utilities in a trench has certain disadvantages. In areas supporting existing construction, a trench can cause serious disturbance to structures or roadways. Further, there is a high probability that digging a trench may damage previously buried utilities, and that structures or roadways disturbed by digging the trench are rarely restored to their original condition. Also, an open trench poses a danger of injury to workers and passersby.

The general technique of boring a horizontal underground hole has recently been developed in order to overcome the disadvantages described above, as well as others unaddressed when employing conventional trenching techniques. In accordance with such a general horizontal boring technique, also known as microtunnelling, horizontal directional drilling (HDD) or trenchless underground boring, a boring system is situated on the ground surface and drills a hole into the ground at an oblique angle with respect to the ground surface. A drilling fluid is typically flowed through the drill string, over the boring tool, and back up the borehole in order to remove cuttings and dirt.

After the boring tool reaches a desired Depth, the tool is then directed along a substantially horizontal path to create a horizontal borehole. After the desired length of borehole has been obtained, the tool is then directed upwards to break through to the surface. A reamer is then attached to the drill string which is pulled back through the borehole, thus reaming out the borehole to a larger diameter. It is common to attach a utility line or other conduit to the reaming tool so that it is dragged through the borehole along with the reamer.

A common approach to planning a bore involves surveying a bore site and manually creating a bore plan on paper. Utilities and other underground objects are typically located and identified on the bore plan. Using the paper bore plan as a guide, the skilled machine operator attempts to direct the boring implement along the pre-planned boring route. A second operator periodically scans the drilling area to determine the actual location of the boring tool. Deviations between the planned and actual bore paths are resolved manually, the accuracy of which is highly dependent on the skill level of the machine and locator operators.

It can be appreciated that a manual approach to planning a bore and assessing the progress of the actual bore relative to a bore plan is problematic. Parameters such as entry angle, rod and product diameters, reamer diameter, rod bend radius, topography variations, utility diameter and safety clearance radius, grades, and minimum ground cover, for example, are generally not properly accounted for using conventional bore planning approaches. A bore plan that fails to properly accommodate these and other parameters is likely to be inaccurate, which may result in excessive drilling machine/pipe/bit wear and delay in completing the bore.

There exists a need in the excavation industry for an apparatus and methodology for automating the process of planning a bore. There exists a need for a bore planning approach that provides for greater accuracy than is currently attainable using existing approaches. The present invention fulfills these and other needs.

SUMMARY OF THE INVENTION

The present invention is directed to a system, method, and computer-readable media for electronically developing a bore plan of a bore site for use in connection with an underground boring machine. Electronically developing a bore plan according to the principles of the present invention involves receiving bore path information representative of an intended bore path at the bore site. Using the bore path information, bore plan data is generated which includes data representative of an intended bore defined along the intended bore path.

Topographical information representative of the topography of the bore site may also be received, in which case the generated bore plan data includes data representative of the intended bore defined along the intended bore path and with respect to the representative topography at the bore site. The topographical information representative of the bore site topography may be received as two-dimensional data or three-dimensional data.

The topographical information typically includes information representative of a height of a surface of earth at the bore site above the intended bore path. The height of the earth's surface at the bore site above the intended bore path may be defined relative to a pre-established reference of the bore site, such as a pre-established bore site reference defined in terms of a latitude, longitude, and altitude. Surface feature information representative of one or more features defined on the earth's surface at the bore site may also be received. The surface feature information may include information representative of surface water at the bore site or information representative of a man-made or natural obstacle, structure or pathway, such as a roadway or other landmark.

The received bore path information representative of the intended bore path typically includes location information concerning one or more targets through which the intended bore path is to pass. The path information representative of the intended bore path may also include pitch and azimuth information concerning one or more targets through which the intended bore path is to pass.

Utility information representative of one or more utilities at the bore site may also be received, in which case the generated bore plan data includes data representative of the intended bore defined along the intended bore path which avoids each of the utilities defined at the bore site. The utility information may, for example, include information concerning one or more of a gas, water, sewer, communications or electrical utility to be avoided by the intended bore path.

The utility information preferably includes location information defining at least two points of each of the utilities at the bore site, although a single point or region may be defined for each utility. The utility information includes information identifying each of the utilities at the bore site as an intersecting utility or a non-intersecting utility. An intersecting utility defines a utility that is expected to pass under or over the intended bore path, while a non-intersecting utility defines a utility that is not expected to pass under or over the intended bore path. The utility information may also include information identifying one or both of a first end and a second end of each utility, and may further include pot hole information of each utility. Pot hole information, as applicable to intersecting utilities, represents data indicating a point where the intended bore path crosses under or over the intersecting utility.

Information concerning the underground boring machine to be used to produce an actual bore at the bore site may further be received and accounted for when generating a bore plan according to the present invention. Machine information may include machine specific information, such as model and functionality, as well as drill rod information. The drill rod information includes information concerning a drill rod to be used to produce an actual bore at the bore site, such as drill rod radius information and drill rod bend radius information.

Bore plan data generated in accordance with the present invention may further consider product information concerning a product to be installed in the intended bore. The product information may include information concerning a diameter, allowable bend radius, and quantity of the product to be installed in the intended bore. Ground cover information concerning ground cover above the installed product may also be received. The ground cover information concerning ground cover above the installed product may be defined with respect to length along the drill rod.

In accordance with another embodiment of the present invention, electronically developing a bore plan of a bore site for use in connection with an underground boring machine involves user interaction with a user-interface of the present invention. According to this embodiment, a topography input window is displayed that receives topographic input data from a user. A utilities input window and a bore path input window are display that respectively receive utility and bore path input data from the user. In response to these input data, a graphical representation of the bore plan comprising graphical representations of each utility and a bore path is presented within a topographic representation of the bore site. The graphical representation of the bore plan preferably has a three-dimensional effect. The graphical representation of the bore plan is typically defined relative to a bore site reference.

Displaying the topography input window involves displaying a distance field and a height field for receiving from the user distance and height input data for each of one or more two-dimensional topographic points. A left/right field may also be displayed to allow the user to enter left/right input data which is used with distance and height input data to define each of one or more three-dimensional topographic points.

Displaying the utilities input window involves displaying at least one location window and a pot hole window for receiving from the user location and pot hole input data for each of one or more utilities. Displaying the utilities input window may also involve displaying an intersecting field and a non-intersecting field for specifying by the user whether a utility is an intersecting utility or a non-intersecting utility. A diameter field and a minimum clearance field may also be displayed for receiving from the user diameter and minimum clearance data for each of one or more utilities. The diameter data indicates a diameter of the utility and the minimum clearance data indicates a clearance defined around each utility through which the bore path is not permitted to pass.

Displaying the bore path input window involves displaying a target window for receiving from the user location data for each of a plurality of bore path targets through which the bore path is to pass. Displaying the bore path input window may further involve displaying distance, depth, and left/right fields for receiving from the user distance, depth, and left/right data for each of a plurality of bore path targets through which the bore path is to pass. The bore path input window may also include pitch and azimuth fields for receiving from the user pitch and azimuth data for each of a plurality of bore path targets through which the bore path passes. A grade window may be displayed for receiving from the user grade data defining a grade through which the bore path is to pass.

A user-interface of the present invention permits a user to alter one or more of the topographic input data, utility input data, bore path input data, and other bore plan data. A user may also alter the graphical representations of a selected utility, topographic or bore path element. Data corresponding to the selected utility, topographic or bore path element may be displayed while graphically altering the graphical representation of the selected utility, topographic or bore path element. A selected bore plan report or graph, a minimum ground cover report or graph, a sonde information report or graph, or a warnings/errors report or graph may be displayed or otherwise produced.

A drill rod selection window may be displayed that receives drill rod input data from the user. The drill rod selection window provides input windows for receiving dill rod input data defining one or more of rod diameter, individual rod length, rod bend radius, and entry point offset. A product selection window may also be displayed that receives product input data from the user. The product selection window provides an input window for receiving product input data defining one or both of product diameter and product quantity. A diameter selection window may be activated to receive diameter input data from the user. The diameter selection window provides an input window for receiving input data defining one or both of a backreamer diameter and a pilot bit diameter.

A machine selection window may be activated that receives machine input data from the user. The machine input data defines one of a number of underground boring machines selectable by the user. An entry angle selection window allows the user to input entry angle data. The entry angle input data defines a drill rack angle with respect to the horizon associated with a selected underground boring machine.

According to another embodiment of the present invention, electronically computing a bore plan of a bore site for use in connection with an underground boring machine involves providing target parameters defining each of a plurality of target points along an intended bore path. Utility parameters may also be provided for defining one or more utilities at the bore site. A maximum bend radius parameter representative of a maximum bend radius of a specified drill rod to be used to produce an actual bore at the bore site is further provided. A bore that connects with each of the target points, avoids passing through the utilities, and avoids exceeding a maximum bend radius of the specified drill rod is calculated using the target, utility, and maximum bend radius parameters.

Providing the utility parameters may involve providing safety clearance region parameters for each of the utilities, and calculating the bore further comprises calculating the bore such that the bore avoids passing through the safety clearance region of each of the utilities. Providing the utility parameters typically involves providing utility parameters that define at least one point of each utility in three-dimensions, such as by providing a distance, left/right, and depth parameter for at least one point of each utility. Providing the utility parameters may also involve providing utility parameters defining one or both of a first end and a second end of each utility, and further involves providing utility parameters defining pot hole parameters of each utility.

Providing the target parameters involves providing target parameters that define each target point in three-dimensions. The target parameters may be provided in terms of a distance, left/right, and depth parameter for each target point or, alternatively, a pitch and azimuth for each target point. One or both of an entrance target point and an exit target point may also be calculated.

Calculating the bore may involve incrementally displacing the bore a specified distance from a particular target point to an adjacent target point. At each displacement increment, a direction that moves the bore toward the adjacent target point is calculated. Calculating the bore may further involve calculating one or more control points to connect the bore between a particular target point and an adjacent target point. Each control point preferably defines a point which is co-planar with respect to the particular and adjacent target points and is co-planar with respect to a direction angle of the adjacent target point.

A region may be defined for the adjacent target point which represents a limit of the specified drill rod's ability to bend as a function of the maximum bend radius of the specified drill rod. Each control point, in this case, defines a point which is co-planar with respect to the particular and adjacent target points, is co-planar with respect to a direction angle of the adjacent target point, and, when connected with the particular target point, tangentially intersects the region by a predetermined allowable bore length.

Calculating the bore may also involve calculating a largest allowable drill string bend radius which connects the bore between a particular target point and an adjacent target point. Calculating the bore may further involve calculating one or more segments which connect the bore between a particular target point and an adjacent target point.

According to yet another embodiment of the present invention, a system for electronically developing a bore plan of a bore site for use in connection with an underground boring machine includes a processor and memory coupled to the processor. A display device is also coupled to the processor. An input device, coupled to the processor, provides for inputting of topographical information representative of topography at the bore site, utility information representative of one or more utilities at the bore site, and bore path information representative of an intended bore path at the bore site. The processor computes bore plan data using the topographic, utility, and bore path information. The bore plan data is presented in textual and/or graphical form on the display as data representative of an intended bore defined along the intended bore path. For example, the bore plan data may be presented in graphical form on the display as data representative of the intended bore defined along the intended bore path and with respect to the representative topography at the bore site.

In one embodiment, the input device is operable by the user (e.g., a mouse, trackball or keyboard). In another embodiment, the input device comprises a communications interface, and the topographical, utility, and bore path information is communicated from an external electronic system (e.g., boring machine controller) to the system processor via the communications interface.

The input device provides for inputting of product information representative of one or more of a diameter, allowable bend radius, and quantity of the product to be installed along the bore path. The processor may compute the bore plan data using the topographic, utility, bore path, and product information. The input device may also provide for inputting of drill rod information representative of one or both of drill rod radius information and drill rod bend radius information. The processor may compute the bore plan data using the topographic, utility, bore path, and drill rod information.

The input device further provides for inputting of bore path information which includes location information concerning one or more targets through which the intended bore path is to pass. The bore path information may include pitch and azimuth information concerning one or more targets through which the intended bore path is to pass. The utility information typically includes at least two location points of each of the utilities at the bore site.

The processor may alter one or more of the topographic information, utility information or bore path information. For example, the processor may alter graphical representations of a selected utility, topographic or bore path element presented on the display in response to a command received by the input device. The processor may also display data corresponding to a selected utility, topographic or bore path element while graphically altering the graphical representation of the selected utility, topographic or bore path element. An output device may also be coupled to the processor. The output device generates a selected one of a bore plan report or graph, a minimum ground cover report or graph, a sonde information report or graph, or a warnings/errors report or graph.

According to a further embodiment of the present invention, a computer readable medium embodying program instructions for electronically developing a bore plan of a bore site for use in connection with an underground boring machine is provided. The program instructions include instructions for receiving topographical information representative of topography of the bore site, receiving utility information representative of one or more utilities situated at the bore site, and receiving bore path information representative of an intended bore path at the bore site. The program instructions include further instructions for generating bore plan data using the received topographic, utility, and bore path information, such that the bore plan data includes data representative of an intended bore defined along the intended bore path and with respect to the representative topography at the bore site.

In an alternative embodiment, the computer readable medium embodies program instructions for displaying a topography input window that receives topographic input data from a user, displaying a utilities input window that receives utility input data from the user, and displaying a bore path input window that receives bore path input data from the user. The program instructions further include instructions for displaying a graphical representation of the bore plan including graphical representations of each utility and a bore path presented within a topographic representation of the bore site.

In accordance with a further embodiment, the computer readable medium embodies program instructions for providing target parameters defining each of a plurality of target points along an intended bore path, providing utility parameters defining one or more utilities at the bore site, and providing a maximum bend radius parameter representative of a maximum bend radius of a specified drill rod to be used to produce an actual bore at the bore site. The program instructions further include instructions for calculating a bore that connects with each of the target points, avoids passing through the utilities, and avoids exceeding a maximum bend radius of the specified drill rod.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIGS. 21A–21B are side and top views, respectively, of an intersecting utility defined within a job site reference system of a bore plan developed in accordance with the principles of the present invention;

FIGS. 22A–22B are side and top views, respectively, of a non-intersecting utility defined within a job site reference system of a bore plan developed in accordance with the principles of the present invention;

FIG. 30 is a block diagram of various components of a boring system that provide for real-time control of a boring operation in accordance with an embodiment of the present invention;

Figure 1:
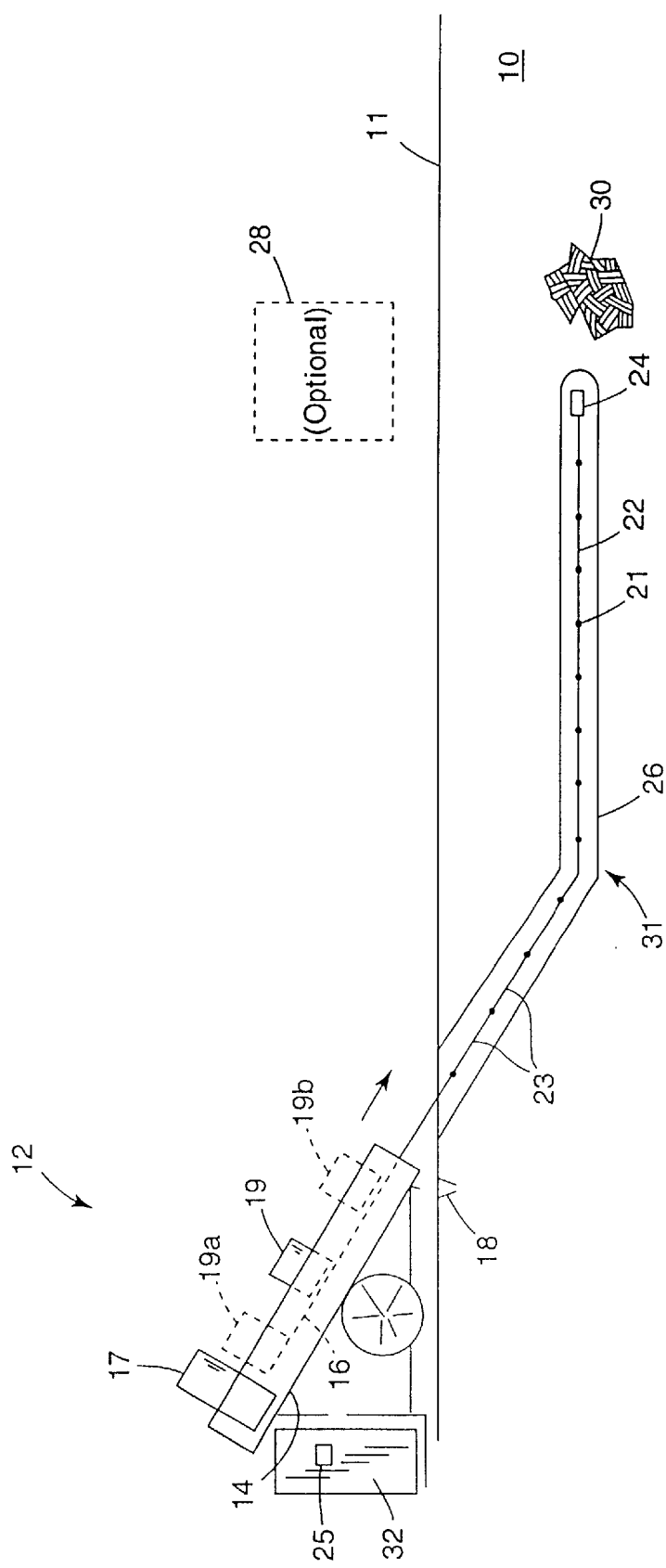
FIG. 1 is a side view of an underground boring apparatus in accordance with an embodiment of the present invention.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF THE EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

Referring now to the figures and, more particularly, to FIG. 1, there is illustrated an embodiment of an underground boring machine capable of producing a generally horizontal bore in accordance with a bore plan developed using a bore planning methodology and apparatus of the present invention. A boring machine, such as that depicted in FIG. 1, typically includes a processor or computer that provides for automatic control of various boring machine functions and activities. A bore plan may be developed using a computer system external to the boring machine, by use of processing and user-interface facilities of the boring machine, or a combination of these computing resources. As such, a bore plan may be developed at the boring site or off-site. For example, boring machine and drill rod information may be defined off-site for a particular job. Topographic and utility information may be subsequently defined on-site, prior to and/or during the actual boring operation.

In order to provide a greater appreciation of the various input/output parameters, computations, graphical displays, reports, and other capabilities associated with a bore planning methodology and apparatus of the present invention, a more detailed description of the boring system shown in FIG. 1 will now be provided. It is understood that the bore planning methodology of the present invention may be used in connection with other excavation machines and techniques, and is not limited for use only in connection with horizontal directional drilling applications.

FIG. 1 illustrates a cross-section through a portion of ground 10 where a boring operation takes place. The boring system, generally shown as the machine 12, is situated aboveground 11 and includes a platform 14 on which is situated a tilted longitudinal member 16. The platform 14 is secured to the ground by pins 18 or other restraining members in order to prevent the platform 14 from moving during the boring operation. Located on the longitudinal member 16 is a thrust/pullback pump 17 for driving a drill string 22 in a forward, longitudinal direction as generally shown by the arrow. The drill string 22 is made up of a number of drill string members or rods 23 attached end-to-end. Also located on the tilted longitudinal member 16, and mounted to permit movement along the longitudinal member 16, is a rotation motor or pump 19 for rotating the drill string 22 (illustrated in an intermediate position between an upper position 19a and a lower position 19b). In operation, the rotation motor 19 rotates the drill string 22 which has a boring tool 24 attached at the end of the drill string 22.

A typical boring operation takes place as follows. The rotation motor 19 is initially positioned in an upper location 19a and rotates the drill sting 22. While the boring tool 24 is rotated, the rotation motor 19 and drill string 22 are pushed in a forward direction by the thrust/pullback pump 17 toward a lower position into the ground, thus creating a borehole 26. The rotation motor 19 reaches a lower position 19b when the drill string 22 has been pushed into the borehole 26 by the length of one drill string rod 23. A new drill string rod 23 is then added to the drill string 22, either manually or automatically, and the rotation motor 19 is released and pulled back to the upper location 19a. The rotation motor 19 is used to thread the new drill string rod 23 to the drill string 22, and the rotation/push process is repeated so as to force the newly lengthened drill string 22 further into the ground, thereby extending the borehole 26. Commonly, water or other fluid is pumped through the drill string 22 by use of a mud or water pump. If an air hammer is used, an air compressor is used to force air/foam through the drill string 22. The water/mud or air/foam flows back up through the borehole 26 to remove cuttings, dirt, and other debris. A directional steering capability is provided for controlling the direction of the boring tool 24, such that a desired direction can be imparted to the resulting borehole 26.

A tracker unit 28 may be employed to receive an information signal transmitted from boring tool 24 which, in tun, communicates the information signal or a modified form of the signal to a receiver situated at the boring machine 12. The boring machine 12 may also include a transmitter or transceiver for purposes of transmitting an information signal, such as an insruction signal, from the boring machine 12 to the tracker unit 28. In response to the received information signal, the tracker unit 28 may perform a desired function, such as transmitting data or instructions to the boring tool 24 for purposes of uplinking diagnostic or sensor data from the boring tool 24 or for adjusting a controllable feature of the boring tool 24 (e.g., fluid jet orifice configuration/spray direction or cutting bit configuration/orientation). It is understood that transmission of such data and instructions may alternatively be facilitated through use of a communication link established between the boring tool 24 and central processor 25 via the drill string 22.

Figure 2:
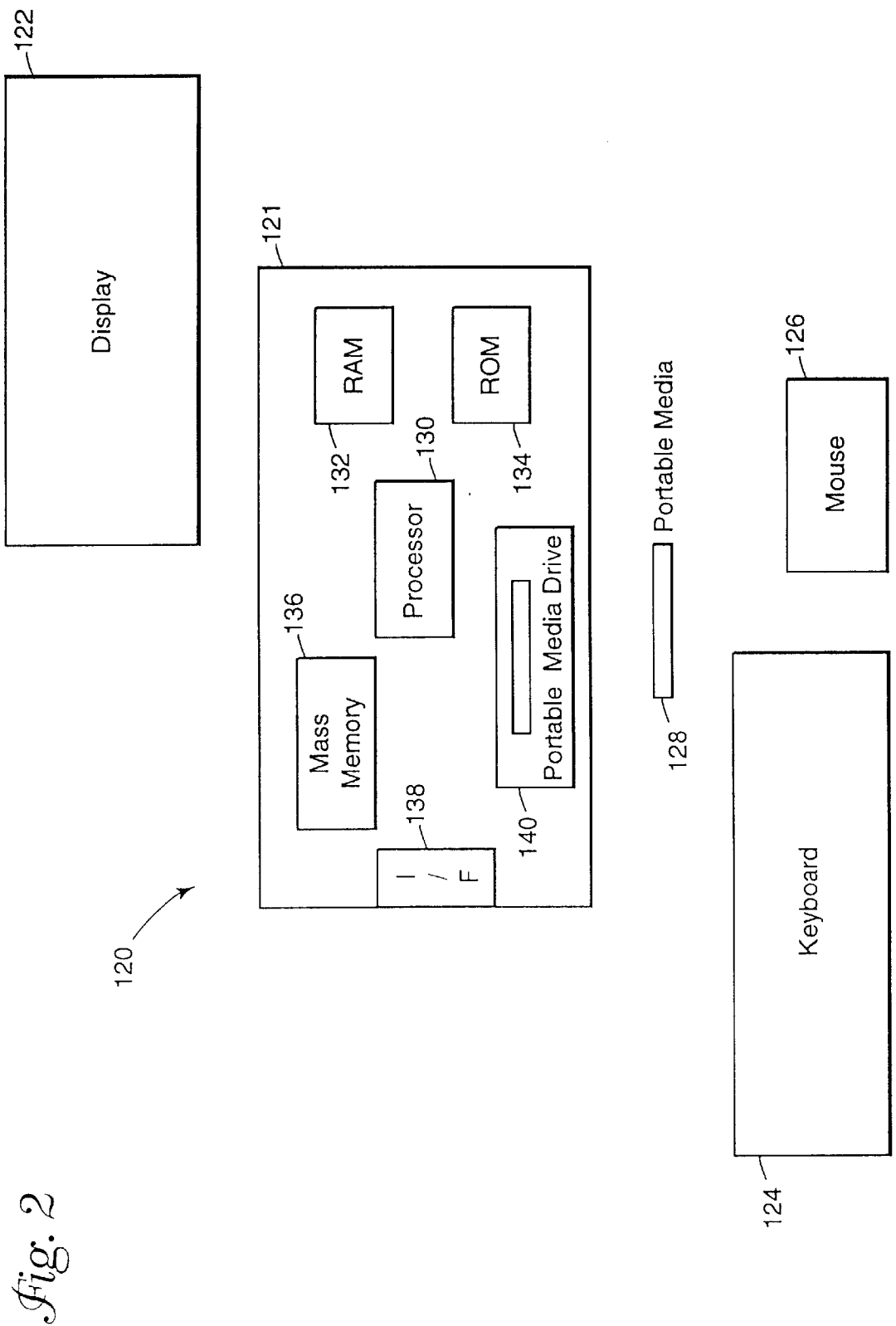
FIG. 2 is a block diagram of a computer system suitable for implementing a bore planning facility of the present invention.

FIG. 2 illustrates various computer system components which may be implemented, all or in part, at the boring machine shown in FIG. 1 or as a separate stand-alone computer system. The computer system 120 represents a processor-based system capable of running bore planning software of the present invention. Computer system 120 includes a processor unit 121 within which various components are depicted. A processor 130 is coupled to several components, including system memory 132 (e.g., Random Access Memory or RAM) and non-volatile memory 134 (e.g., Read-Only-Memory or ROM). A mass memory 136 may also be provided to store various data generated during bore plan development software usage prior to and/or during a boring operation. Mass memory 136 may be of a memory technology capable of providing for controlled storage and erasure of data (e.g., EEPROM, Flash memory, etc.).

A portable media drive 140 is also incorporated into computer system 121 to provide for reading from and/or writing to a portable media 128. For example, portable media 128 may be a computer-readable media, such as a CD-ROM or floppy diskette, on which is stored bore planning software of the present invention. Portable media drive 104 reads the program instructions stored on portable media 128 and configures memories 132/134/136 of the computer system 121 as needed to implement a bore planning facility of the present invention.

Computer system 121 may further include one or more user input devices, such as a keyboard 124 and a mouse 126. An input/output interface 138 is provided to facilitate communication of data, control, and/or power signals between the computer system 121 and the boring machine or other external computing/power system. The components of the processor unit 121 may be provided in a housing separate from that of a processor of the boring machine. Alternatively, the processor unit components may be integrated as part of the boring machine control electronics.

In general, a well-designed bore plan provides for a drill string that is as short as possible. The bore plan should provide for a borehole that remains a safe distance away from underground utilities so as to avoid strikes therewith. The drill path should turn gradually so that stress on the drill string and product to be installed in the borehole is minimized. The bore plan should also consider whether a given utility requires a minimum ground cover. A bore planning facility of the present invention significantly enhances horizontal drilling operations by providing location, direction, and other information of the bore, anywhere along its length. For example, the bore planning facility provides for viewing of technical and graphical drill rod-by-drill rod details, minimum ground cover information, and warning and error information. The user may also examine target bend radii and other cross information. Accurate as-built reporting of the borehole as actually drilled is also stored. For example, the bore planning facility may receive as-built data directly from a locator device via a communications link and/or allows an operator to enter the location data directly.

Figure 3:
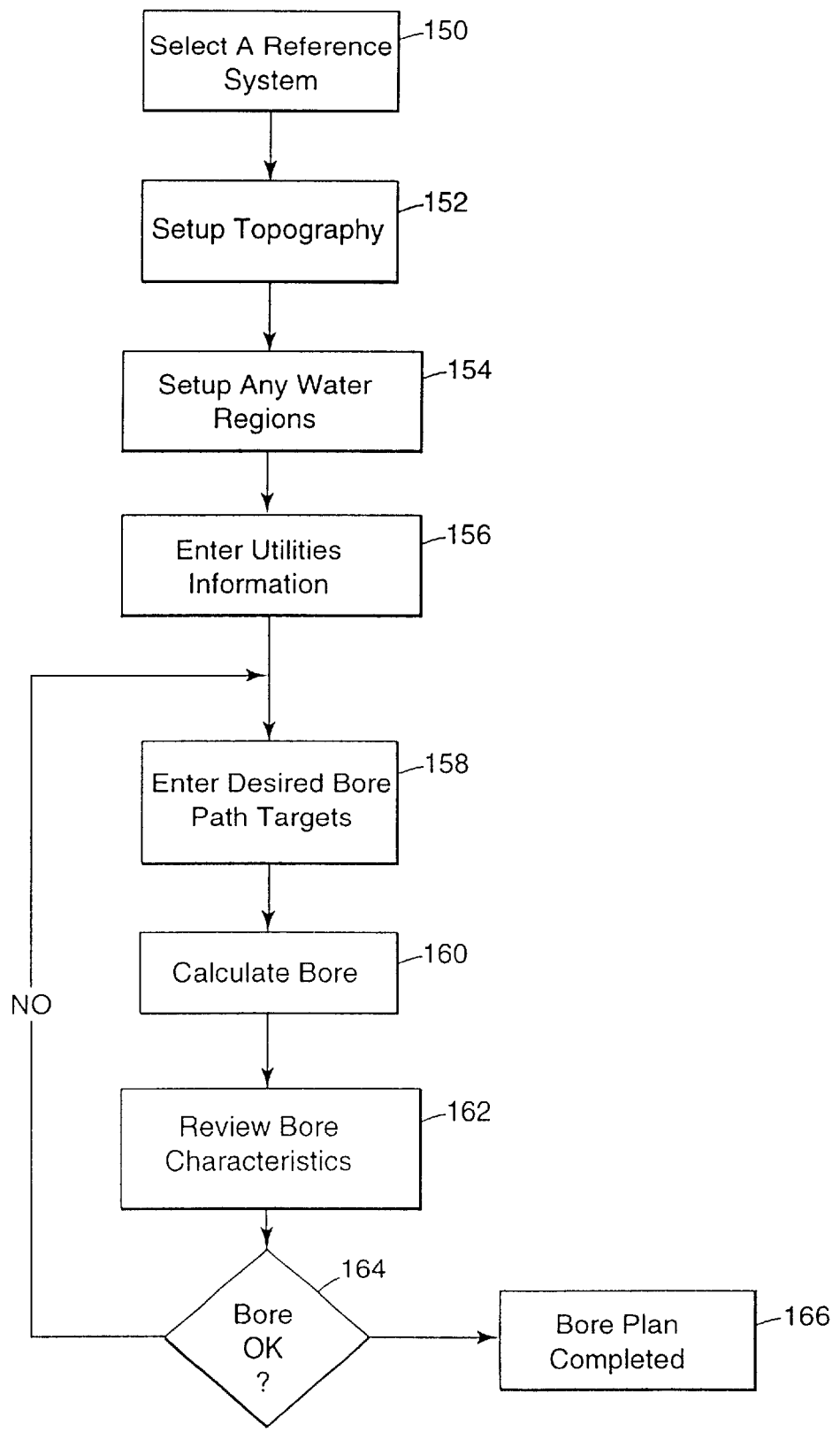
FIG. 3 is a flow diagram of various steps for developing a bore plan in accordance with an embodiment of the present invention.

FIG. 3 depicts several operations associated with the development of a bore plan according to the present invention. A three-dimensional (3D) reference system is defined 150 by the bore plan designer. The reference system is a graphical representation of the job site within which elements of a bore and their spatial relationship with respect to a reference are defined. The topography of the job site may then be established 152. Any regions occupied by water (e.g., ponds, rivers, etc.) may also be defined 154. Utilities of various types which are located at or near the job site are also specified 156. A number of bore path targets which define the trajectory of the borehole are defined 158. Using the above-specified data, a bore is calculate 160. The bore plan designer may then review 162 the bore characteristics. If the bore is not acceptable, the designer may modify 158 one or more bore path targets, recalculate the bore 160, and reviews 162 the recomputed bore. This process may be repeated until the calculated bore is acceptable, at which time the bore plan procedure is completed 166.

Figure 4:
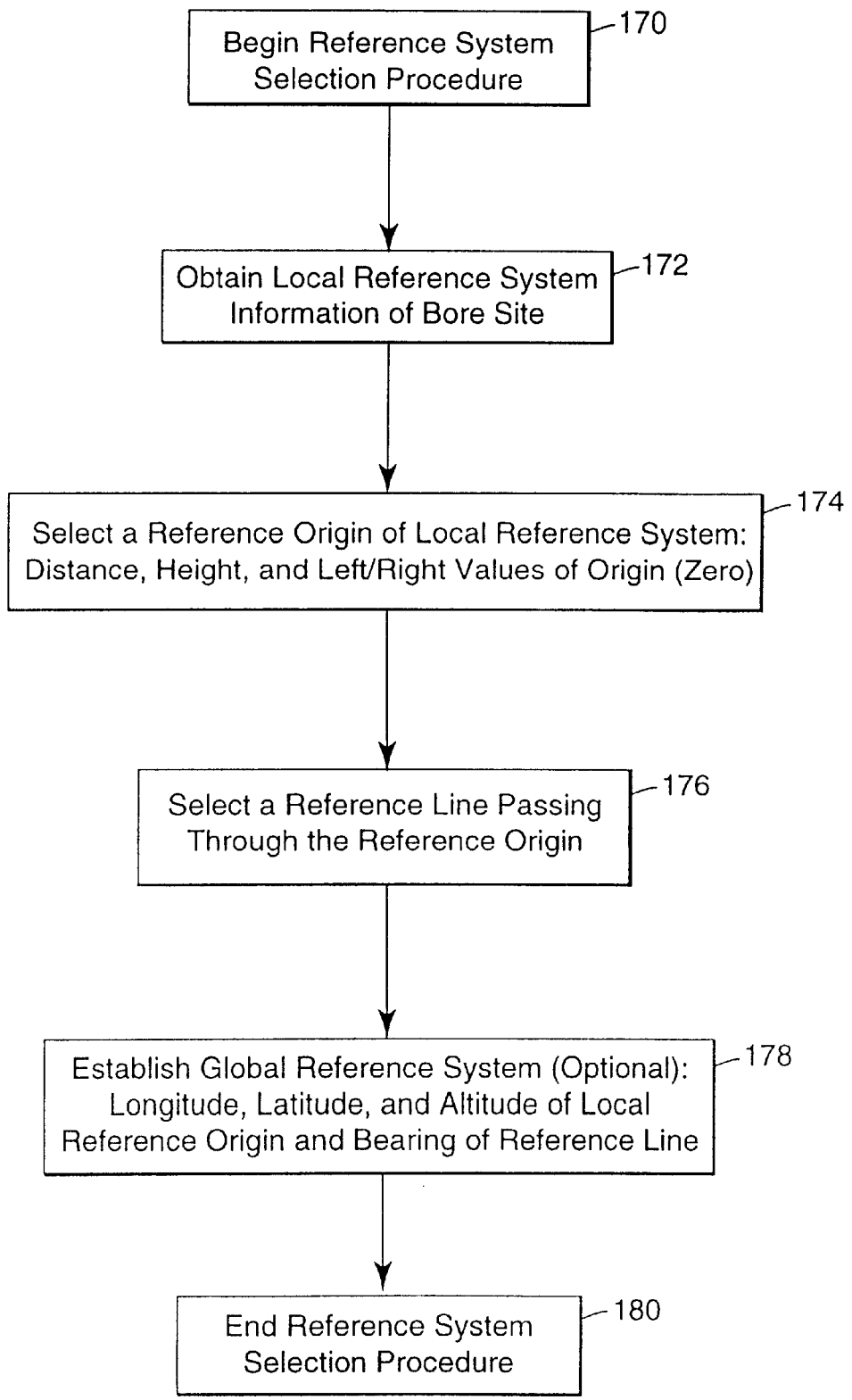
FIG. 4 is a flow diagram of various steps for establishing a reference system of a bore plan in accordance with an embodiment of the present invention.

FIG. 4 depicts several steps involved in defining the reference system of the job site in accordance with an embodiment of the present invention. For the following discussion, it may be helpful to refer to the graphical bore site representations provided in FIGS. 16, 19, 21–24, and 27. After initiating 170 the reference system selection procedure, local reference system information is obtained 172 and entered. It is desirable, although optional, that an accurate survey of the job site be performed so that the bore plan developed using bore planning software of the present invention is defined relative to a local reference system representative of the actual job site. The operator selects 174 a reference origin, which corresponds to Distance, Height, and Left/Right values of zero (i.e., [0, 0, 0]). The operator then selects 176 a reference line that runs through the reference origin. The reference line preferably lies in the general direction of the bore, is horizontal, and is straight. A global reference system may also be defined 178 for the job site, in which case the operator enters the longitude, latitude, and altitude of the local reference origin and the bearing of the reference line.

After the reference system is established 180, operators can uniquely define three-dimensional elements within the reference system by specifying the Distance, Height, and Left/Right values of each element. Distance refers to displacement along the reference line in the positive direction relative to the reference origin. Height refers to displacement above the reference line and the reference origin. Left/Right displacement refers to displacement left or right of the reference line in the positive distance direction. Direction may also be uniquely specified by entering an azimuth value, which refers to a horizontal angle to the left of the reference line when viewed from the origin facing in the positive distance direction, and a Pitch value, which refers to a vertical angle above the reference line. Some objects are referenced relative to the surface of the earth. These points are specified using a Depth value below the surface of the earth. Object Depth refers to the topographical height of the object less the height of the object. It can be seen that the reference origin and reference line allow the user to enter all information relative to a local reference system.

The reference line can originate at any location the operator wishes and may extend in any horizontal direction such that the resulting bore is a function of the distance along the reference line. In an embodiment in which the reference is a straight line, rather than a curve, Distance, Left/Right, and Height translate directly into the right-handed Cartesian coordinate system of (x, y, z), with the reference point located at (0, 0, 0) and the reference line extending along the x-axis. Therefore, moving right of the reference line is equivalent to moving in the −y direction, and moving below the reference line results in a negative height or movement in a −z direction.

As discussed above, some objects are defined in terms of Depth, rather than Height, to represent their vertical location. The depth axis is defined as anti-parallel to the height axis and it originates on the surface. Since the surface need not be flat, entities with identical depths may have different heights. The difference between the terms Distance and Length should be in appreciated. The term Distance represents displacement along the straight reference line, whereas the term Length represents displacement along some curving path. For example, a piece of rope may have a 50' Length, whereas the Distance between the two ends may be only 6 inches.

Distance, Left/Right, and Length parameters are preferably represented in terms of meters or feet, with 1 decimal place of resolution. Height is preferably represented in terms of centimeters or inches, with no decimal. Depth is preferably represented in terms of centimeters, inches, or feet and inches. If the applicable user-defined preference is set to accept feet and inches for the Depth parameter and the user enters only one number, this number is interpreted as inches. Angles are definable in terms of % slope or degrees, with 0 or 1 decimal places of resolution. Volumes are definable in terms of gallons or liters, with no decimal places. Pipe bend is stored as bending radius in terms of meters. It is understood that the unit system employed may be varied as desired (e.g., English, metric, etc.).

Figure 5:
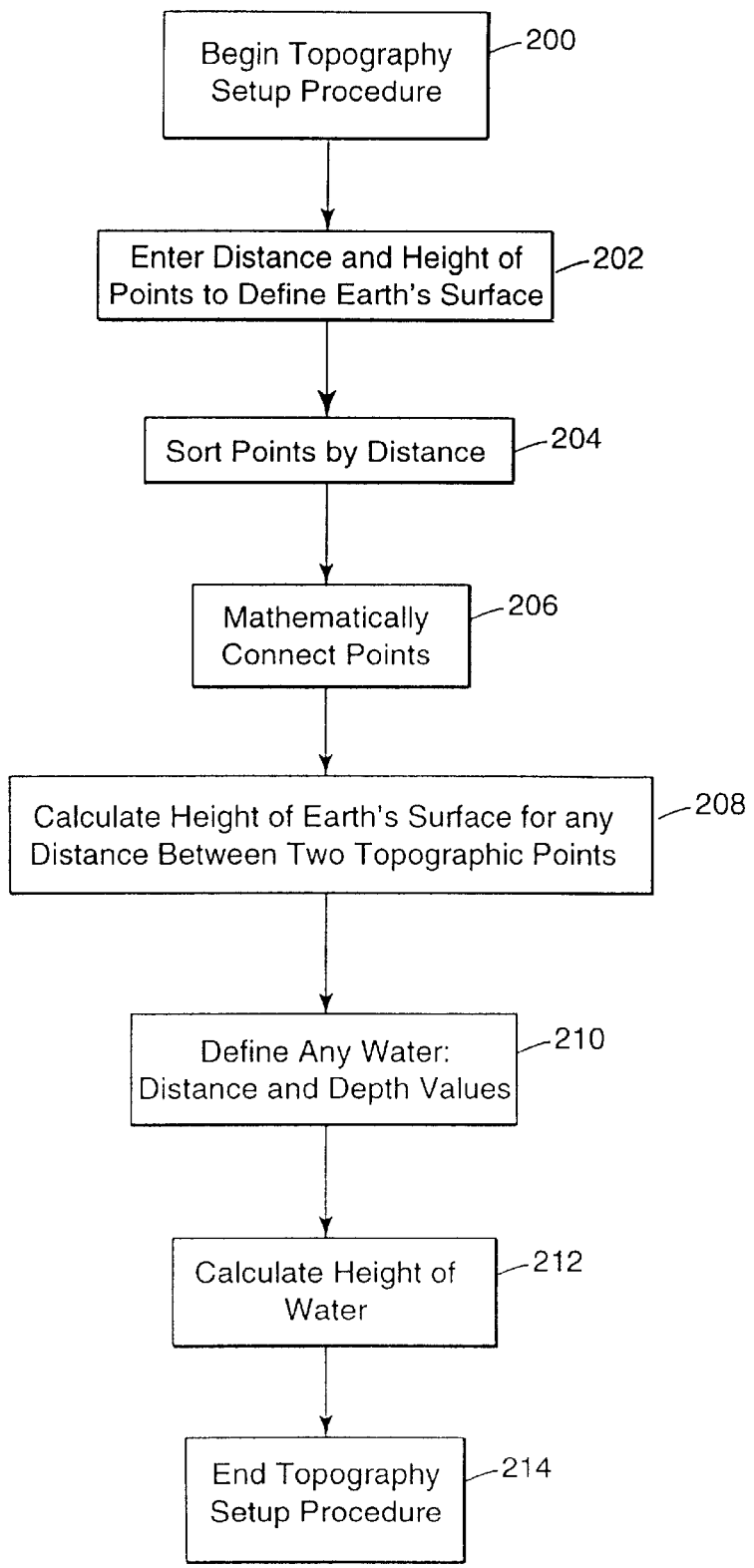
FIG. 5 is a flow diagram of various steps for establishing the topography of a bore plan in accordance with an embodiment of the present invention.

FIG. 5 depicts several steps associated with defining the topography of a given bore site/job. Topography is used to set the scope (i.e., upper and lower Distance bounds) of the graphical display. Establishing the topography provides for the generation of a graphical representation of the bore site.

In this context, topography refers to a two-dimensional representation of the earth's surface. Alternatively, the designer may initially construct the general topography of a given bore site in three dimensions. In this alternative context, topography refers to a three-dimensional representation of a volume of earth which includes the earth's surface. Just as setting up a reference system uniquely defines Distance, Height, Left/Right, Pitch and Azimuth, setting up the topography uniquely defines Depth for any point.

After initiating the topography setup procedure 200, the topography of a job site is established by entering 202 a series of two-dimensional points defined in terms of Distance and Height values. Since no Left/Right data is entered in the case of a two-dimensional topographic embodiment, the bore planning software assumes the Height remains constant at a given Distance for all Left/Right values. In the case of a three-dimensional topographic embodiment, a user enters a series of three-dimensional points defined in terms of Distance, Height, and Left/Right values. Each topographical point has a unique Distance associated with it. The bore planning software sorts 204 the points based on Distance, and mathematically and graphically connects 206 the points with straight lines. The bore planning software calculates 208 the Height of the surface for any Distance between two topographical points using linear interpolation between the nearest two points.

Any surface water within the job site may be defined 210. Surface water is defined by the user in terms of Distance and Depth. The bore planning software assumes left-to-right uniformity. It is noted that the term Depth as this term pertains to water is in the opposite direction to the general Depth definition provided hereinabove. Using Distance, Depth, and the topography, the Height of the water is calculated 212. The bore planning software assumes that the water exists at this Height in the positive and negative Distance directions until that Height intersects the topography. If no topography is reached, the water Height stops at the upper and lower bounds of the topography scope. The operator may adjust the various parameters affecting the job site topography until the topography is acceptable, at which time the topography setup procedure is terminated 214.

Figure 6:
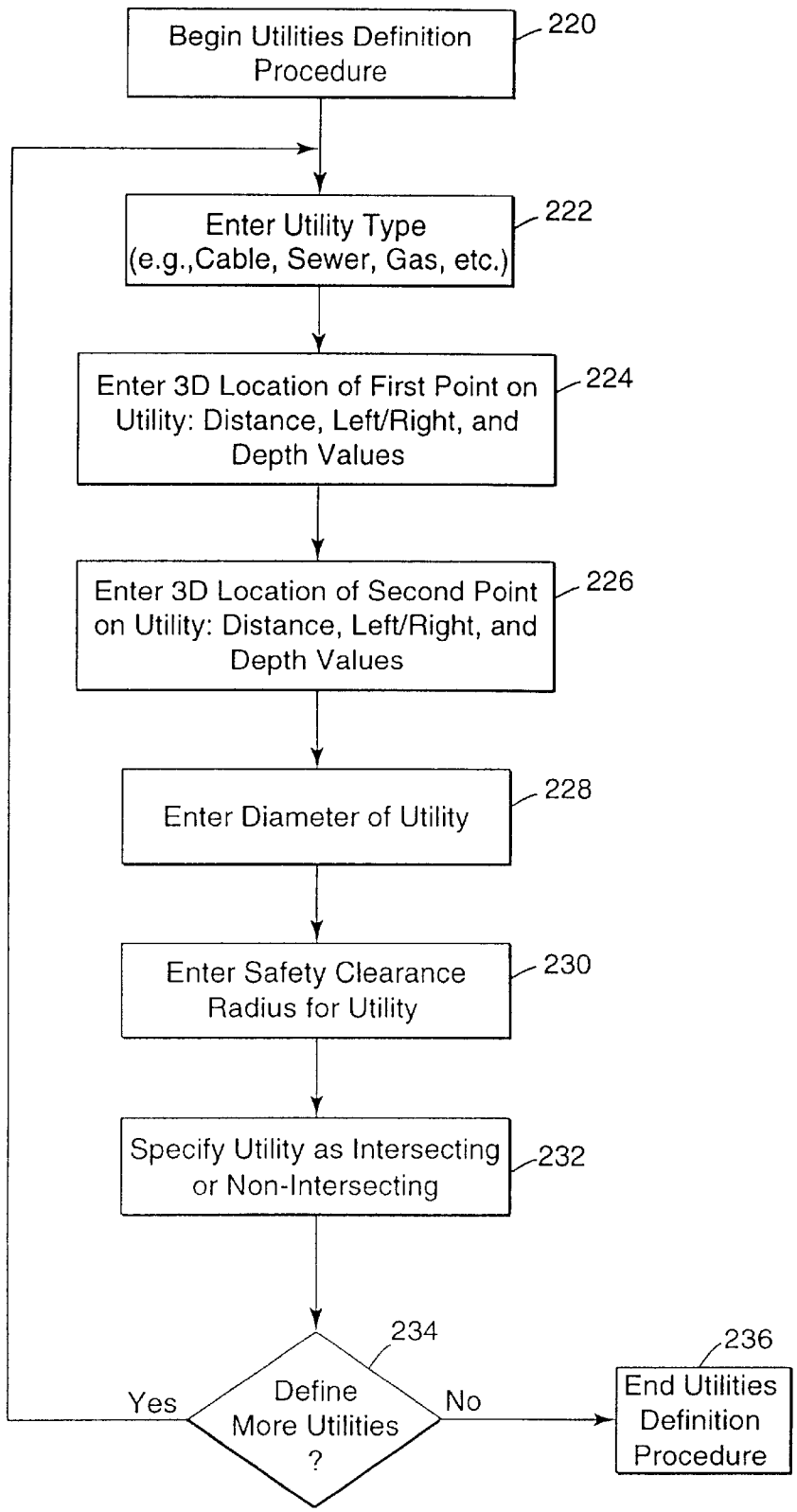
FIG. 6 is a flow diagram of various steps for defining utilities of a bore plan in accordance with an embodiment of the present invention.

FIG. 6 depicts various steps involving the definition of one or more utilities within the reference system of a particular job. In general, utilities are assumed to be cylindrical in configuration. After initiating 220 the utilities definition procedure, the type of utility is entered, such as cable, sewer, gas or a user-defined utility, for example. Selection of a given utility type determines the color of the utility when graphically displayed or reported on a printout.

The three-dimensional location of a utility is specified by defining the 3D location of at least two points on the utility. The operator enters 224 the 3D location of a first point on the utility in terms of Distance, Left/Right, and Depth. The operator then enters 226 the 3D location of a second point on the utility, also in terms of Distance, Left/Right, and Depth. Each utility also has an associated diameter and a safety clearance radius. The diameter defines the space the utility occupies and the clearance radius defines the additional space surrounding the utility that is neither a bore bit nor back reamer may enter. The user enters the diameter 228 and safety clearance radius 230 for the utility.

Utilities are grouped into at least two classes. In one embodiment, utilities are defined as either intersecting or non-intersecting utilities. Intersecting utilities are utilities that the future bore is expected to pass over or under. These utilities require the operator to enter the location of the "pothole" that was used to locate the utility. This is done to ensure that users follow regulations that require them to physically locate a utility that they plan to pass over or under. Intersecting utilities also have an allowable variance. If the planned bore does not provide for the allowable variance of the pothole, a warning is displayed. This warning alerts the operator that the utility may be at a different location and orientation nearer to the bore than the operator expects, and that the operator should dig another pothole in order to accurately locate the utility.

Non-intersecting utilities are utilities that the future bore is not expected to pass over or under. These utilities do not require a pothole to accurately determine the utility depth, since the bore should not come near them. If the bore plan crosses a non-intersecting utility, an error message is produced to alert the operator to this error condition. The user specifies 232 whether the utility is an intersecting or non-intersecting utility. If additional utilities are to be defined 234, the above steps are repeated, after which the utilities definition procedure is terminated 236.

Figure 7:
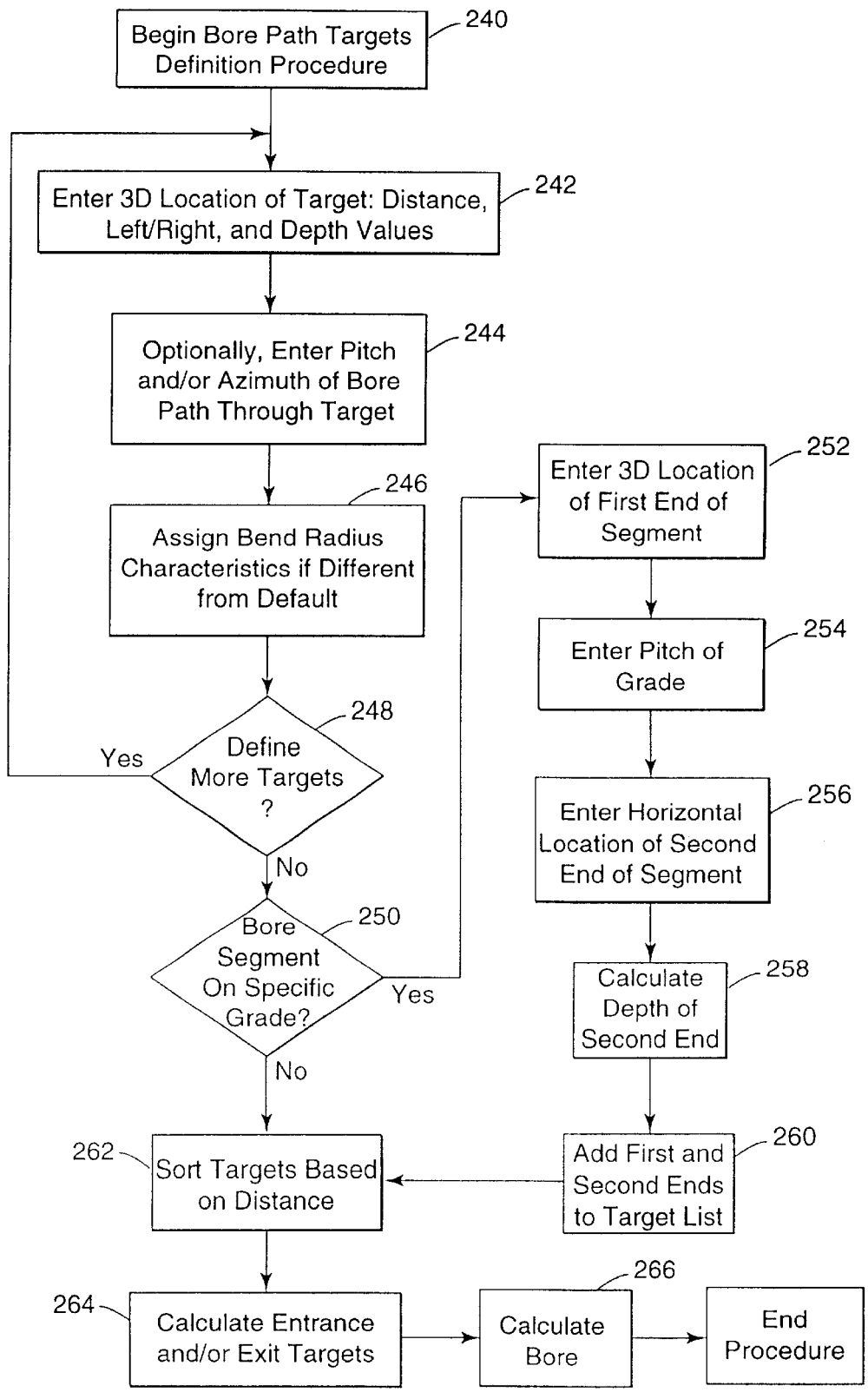
FIG. 7 is a flow diagram of various steps for defining targets of a bore plan in accordance with an embodiment of the present invention.

FIG. 7 depicts various steps involving the definition of bore path targets. After all of the existing objects have been entered or defined, the operator is ready to plan a bore path. The operator does this by entering any number of targets through which the bore path will pass. Bore path targets are defined in terms of a three-dimensional location (Distance, Left/Right, and Depth). After initiating the bore path targets definition procedure 240, the user enters 242 the 3D location of a target by specifying the target's Distance, Left/Right, and Depth values. The operator may optionally enter 244 the Pitch and/or Azimuth at which the bore path should pass through the target. The operator may assign 246 bend radius characteristics to a bore segment, which differ from the pre-established default characteristics, by entering the new values in the maximum bend radius and minimum bend radius sections for the destination target. The above-described procedure is repeated 248 for each target to be defined.

The bore planning software also supports planning of bore segments that lie on a specific grade (i.e., pitch). If 250 a particular bore segment lies on a specific grade, the user may enter 252 the three-dimensional location of a first end of the segment, the desired pitch 254, and the horizontal location 256 of a second end of the segment. The bore planning facility calculates 258 the Depth of the second segment end using trigonometry, and adds 260 both first and second segment ends to the list of targets. The bore planning software sorts 262 all user and software defined targets based on target Distance. An operator can initiate automatic computation 264 of entrance and/or exit targets by pressing an appropriate button. Alternatively, these computations 264 may be performed at the time of calculating 266 a bore.

Figure 8:
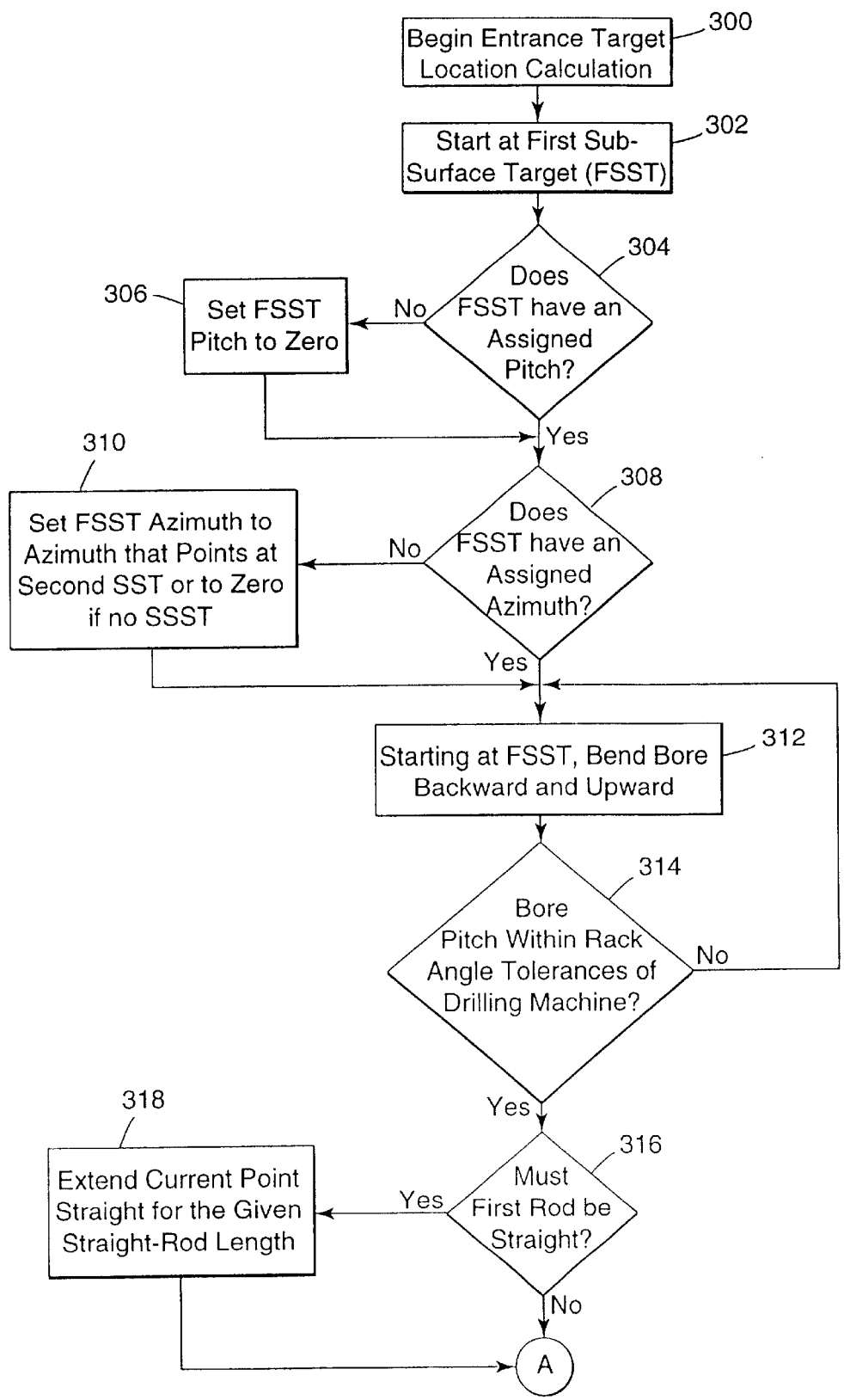
FIGS. 8–9 are flow diagrams depicting various steps for calculating an entrance target location of a bore plan in accordance with an embodiment of the present invention.
Figure 9:
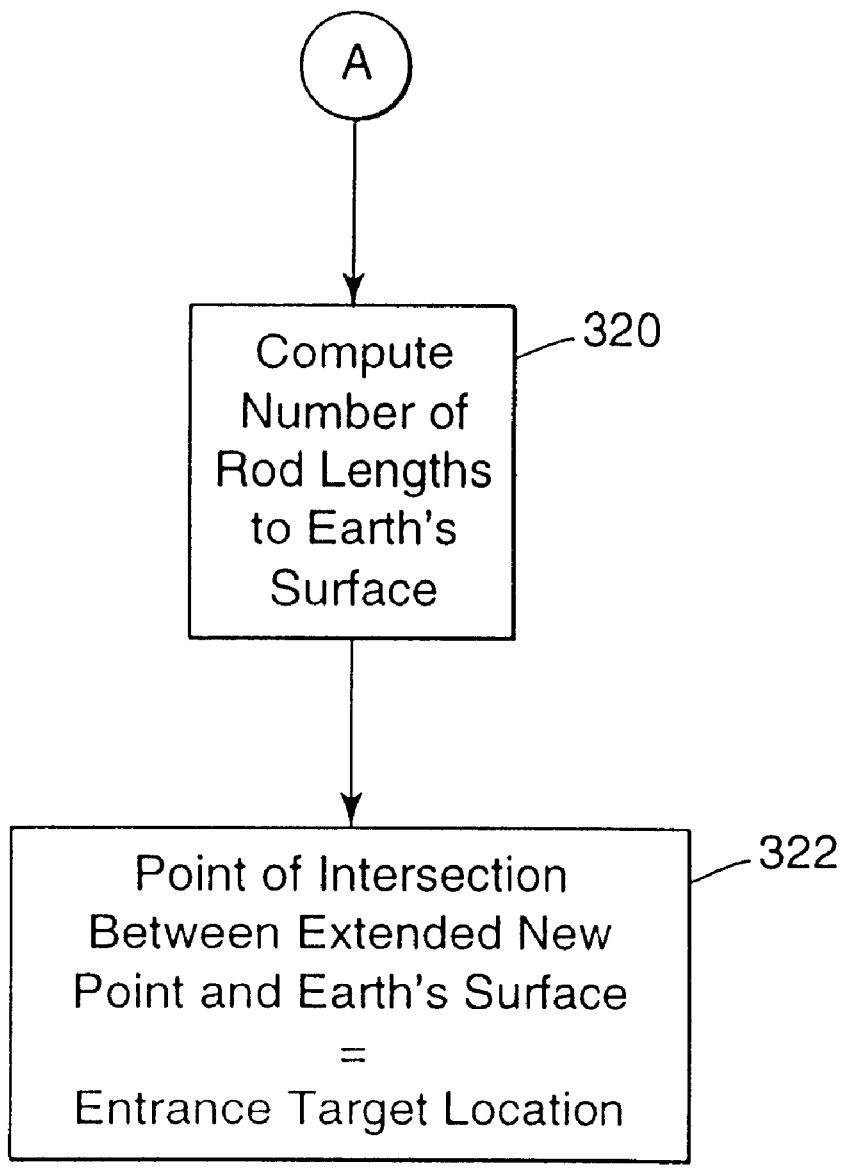

FIGS. 8 and 9 depict in greater detail various steps involved in the computation of an entrance target location. After initiating 300 the entrance target location calculation procedure 300 manually or automatically, a first sub-surface target (FSST) is analyzed 302. If 304 the FSST does not have a Pitch value assigned to it, a Pitch value for the FSST is set to zero. If 308 the FSST does not have an Azimuth value assigned to it, the Azimuth of the FSST is set 310 to an Azimuth that points at a second sub-surface target (SSST) or to zero if no SSST is defined. Starting at the FSST, the bore is incrementally bent 312 backward and upward. If 314 the bore pitch is not within rack angle tolerances of the boring machine, incremental backward and upward bending 312 of the bore continues. When the bore pitch falls within rack angle tolerances of the boring machine, the bore planner software determines 316 whether the first rod of the drill string must be straight. If so, the bore is extended 318 in a straight line, and the number of rod lengths to the earth's surface is computed 320. The point of intersection between the extended new point and the earth's surface defines 322 the entrance target location.

Figure 10:
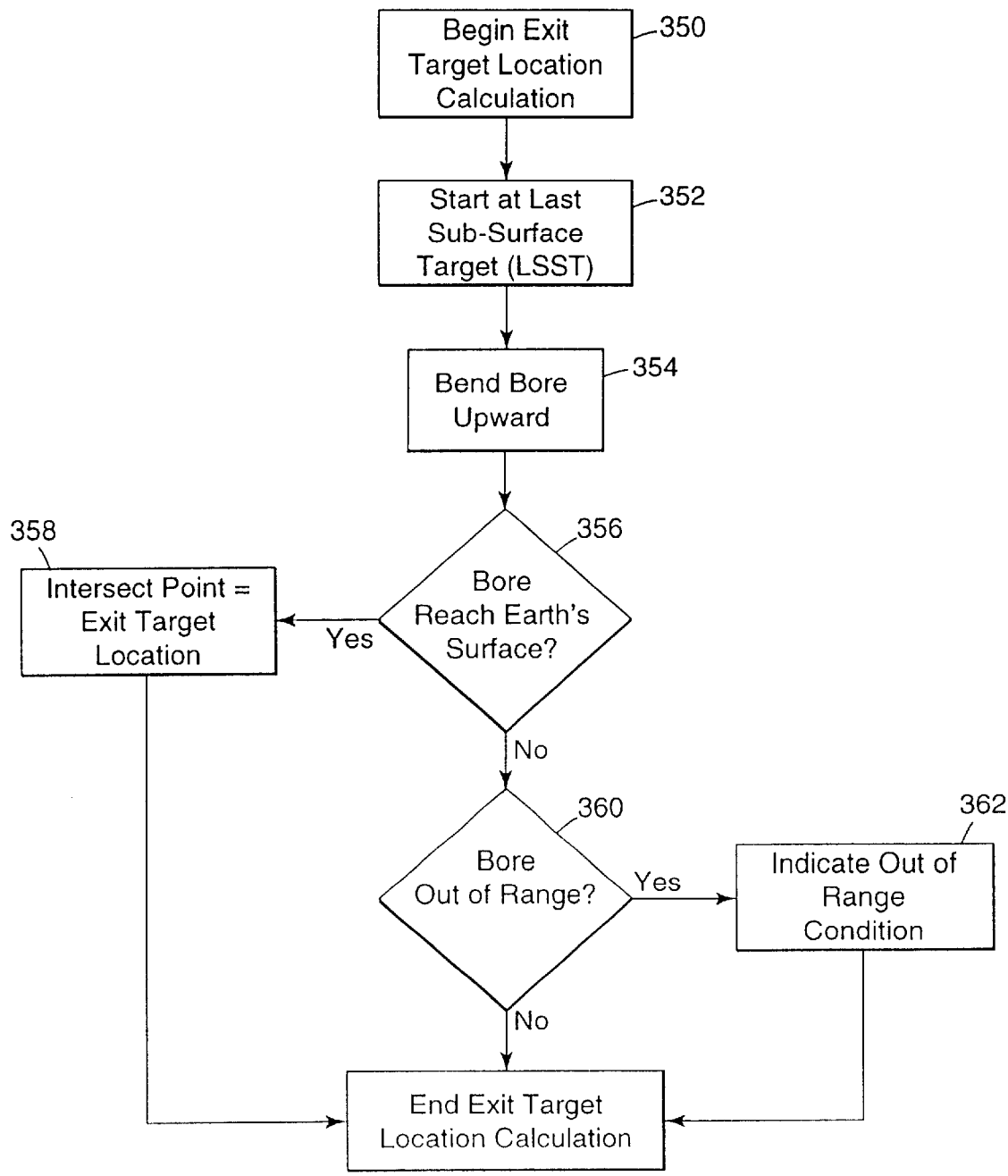
FIG. 10 is a flow diagram of various steps for calculating an exit target location of a bore plan in accordance with an embodiment of the present invention.

FIG. 10 depicts various steps involving the calculation of an exit target location for the bore path. After initiating 350 this routine automatically or manually, a last sub-surface target (LSST) is analyzed 352. The bore is bent 354 upward from the LSST. If 356 the bore reaches the earth's surface, the point of intersection between the bent bore and earth's surface defines 358 the exit target location. If 360 the bore is out of range, an indication of so is reported 362 to the operator.

A bore path constructed using a bore planning facility of the present invention is preferably defined by a mixture of arcs and straight lines. Arcs are used to turn a bore in a desired direction and the lines are used to arrive at a desired location, which is represented by a three-dimensional point. The bore planning facility computes an angle of an arc needed to turn a bore path from a direction associated with an initial point (e.g., a particular target) to a direction of a destination point (e.g., an adjacent target), so that the two points may be connected with a straight line.

A list of three-dimensional points may thus be defined for a bore, so that when smoothly connected, these point form a "segment" of a bore. To determine such points for a particular bore, the bore planning facility begins at a particular target and systematically moves to an adjacent target. All but the last point in the list is located a pre-established number of step size units from its neighbors along the curved path of the bore. When the segment reaches its destination target, the last point is pulled back so that it does not pass the destination target.

Figure 29:
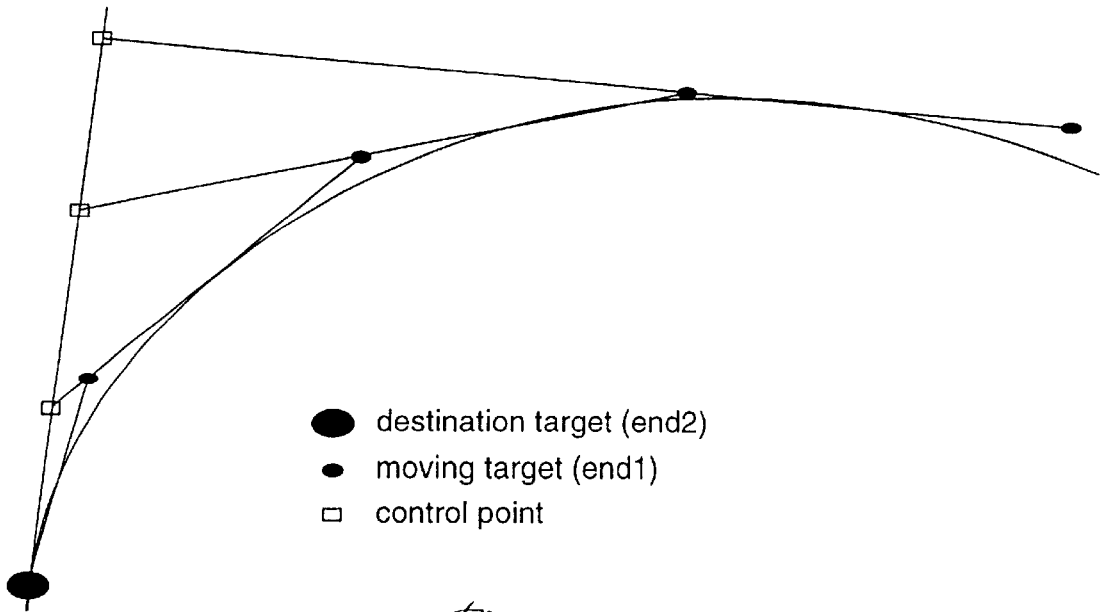
FIG. 29 illustrates in graphical form a process of connecting targets having different directions using control points according to a bore calculation methodology of the present invention.

Some destination targets have associated directions while others do not. If there is no direction component associated with a given destination target, the bore planning facility directs the bore directly toward the destination target without regard to the pitch or azimuth of the bore. In the case where there is an associated direction for a given target, the bore planning facility must instead direct the bore to one or more control points that are separate from the destination target and gradually merge with the destination target. The purpose of a control points is to lead the bore path to the destination target along a specific route, thereby matching the destination target's required direction. As the control point draws the bore string into alignment with the destination direction, the control point moves closer to the destination target. With every iteration, the control point is updated. FIG. 29 illustrates in graphical form the process of connecting targets having different directions using control points as discussed above.

Calculating the bore, as discussed above, involves connecting each target pair defined by the operator. Each target pair may be connected using the following routines, which are to presented in pseudo-code fashion. The routines simulate the actual boring process by starting at the first target and moving incrementally toward the second target, such as in 25 cm increments, it being understood that the step size may be adjusted to change the resolution of the computations as desired. At each increment, the routine calculates the direction the bore should turn so that the bore can enter the second target in the correct direction.

EXAMPLE #1 while ($1^{st}$ target's Distance is less than $2^{nd}$ target's Distance)

if($2^{nd}$ target has neither angle)
      set control point equal to $2^{nd}$ target
    else
      fill in missing destination target angles with angle between both targets {Azimuth=tan[(tar2.y−tar1.y)/(tar2.x−tar1.x)]} find the torus surface around the destination target that represent the limits of the rod's bending ability
    calculate a control point
      1. which is co-planar with both targets
      2. which is co-planar with destination target's direction angles
      3. when connected to $1^{st}$ target, tangentially intersects the torus
with 1 cm of allowed bore length,
    try to turn the bore ($1^{st}$ target) towards the control point
    advance target in a straight line for unused portion of 1 cm.
record every $25^{th}$ target location
record final (moving) target location The following routines may be performed automatically each time the operator makes a change to any topography, target or utility parameter. Alternatively, these routines may be performed at the time the bore is calculated.

EXAMPLE #2

Fill Radii—of Each Target
  1. If the target's maximum bend radius slot is empty or computer generated, the default maximum bend radius is copied into it and the "computer-generated" flag (CGF) is set. If the default maximum bend radius slot is empty, the target's maximum bend radius slot is also empty.
  2. If the target's minimum bend radius slot is empty or computer generated, the default minimum bend radius is copied into it and the CGF is set.

Fill Angles—of Each Target
  1. If the $1^{st}$ sub-surface target (FSST) has no Pitch or is computer assigned, it is assigned a Pitch=0° and the CGF is set.
  2. If the FSST has no Pitch or the CGF is set, it is set to point to surface target if it exists or the $2^{nd}$ subsurface target, and the CGF is set.
  3. If there is no entrance target, go to 6
  4. If the entrance target's Pitch is empty or computer generated, it is filled with whatever Pitch allows it to connect with the FSST.
  5. If the entrance targets Azimuth is empty, it is set to point at the FSST if it exists, otherwise it is set to 0
  6. For all targets after the FSST except the last one
    a) find the direction to the next target
    b) find the direction from the last target
    c) assign empty targets' Pitch and Azimuth a weighted combination of (a) and (b) based on Distance from each target
  7. An empty Azimuth or Pitch on the last target is filled to point to the second to last target.

The bore planning software uses a well-known Bisection method to determine the largest allowable drill string bend radius which connects the targets. A pseudo-code example of this method is provided below:

EXAMPLE #3 lower_bounds←0
if (destination target has maximum bend radius)

upper_bounds←destination target's maximum bend radius
else
upper_bounds←destination target's minimum bend radius
Apply Bisection method to ArcSegmentArc target connector over bend_radius=[lower_bounds .. upper_bounds] to find maximum bend radius that connects targets The following routine may be used to connect adjacently situated targets. This routine is referred to herein as the ArcSegmentArc method, which is implicated in Example #3 above. It is assumed that each target has been assigned a location, direction, minimum bend radius and possibly a maximum bend radius.

EXAMPLE #4

1. Find the segment, seg, that connects the two targets.
2. Using that segment as a direction vector, find the point p1, such that:
    a. a 3D arc exists which
        i. has an end point of p1 pointing in the direction seg
        ii. has an end point at the $1^{st}$ target pointing in the direction indicated by the $1^{st}$ target's Pitch and Azimuth
        iii. has the desired bend radius
    b. p1 is closer to the $2^{nd}$ target than the $1^{st}$ target is
3. Using that segment as the same direction vector, find the point p2 such that:
    a. a 3D arc exists which
        i. has an end point of p2 pointing in the direction seg
        ii. has an end point at the $2^{nd}$ target pointing in the direction indicated by the $2^{nd}$ target's Pitch and Azimuth
        iii. has the desired bend radius
    b. p2 is closer to the $1^{st}$ target than the $2^{nd}$ target is
4. calculate a new segment, seg, that connects p1 and p2
5. if arriving at this step 1000 times, then there is no solution. Report an error and end.
6. if the new seg is not equal to the old seg, go to (2)
7. Connect the $1^{st}$ target to p1 using arc defined in (2)
8. Connect the p1 to p2 using segment seg
9. Connect p2 to the $2^{nd}$ target using arc defined in (3)
10. The results of 7,8, & 9 define the ArcSegmentArc path that connects the two targets Once the bore path is calculated, the bore planning software checks for problems and reports any problems to the user, preferably as data presented in a tabular format. Problems are categorized as Warnings, in which case the calculated bore is usable, or Errors, in which case the calculated bore is unusable.

The calculated bore is analyzed by stepping along the bore in 25 cm intervals and testing for an number of potential problems. Such potential problems include, for example, intersecting utilities, missing a utility pothole variance, breaking the surface, exceeding a minimum sonde angle, and exceeding a maximum sonde angle.

The bore planning facility validates all targets and angles. The bore planning facility ensures that at least two targets have been defined, either manually or automatically added targets. The bore planning facility also ensures that no two targets have the same Distance. The bore calculations assume that the set of targets have an ever-increasing Distance component. If such duplicate targets exist, the operator is prompted to delete one of them or the bore calculation procedure is halted.

An Allowable Variance Warning, for example, is generated if the bore path does not cross into the vertical cylindrical space defined by an intersecting utility's pothole Distance, Left/Right, and Allowable Variance (as radius). A Surface Break Warning is generated is the bore path comes out of the ground, such that it passes above the defined topography, which is detected as a change in sign of the Depth from positive to negative. A Sonde Angle Warning is generated when the Pitch at some segment of the path is greater to or less than the physical capabilities of the sonde being used.

A Bend Radius Exceeded Error is generated when the bore had to use a tighter bend radius than the allowed minimum in order to connect two targets. A Strikes Utility Error is generated when the bore planning facility finds the closest point between the bore (i.e., a polynomial curve) and the center of a utility (i.e., a segment). If the Distance between these points minus the utility's radius minus the utility's clearance minus the backreamer radius is less than zero, the utility bore is said to intersect the utility. If the diameter of the bit is larger than the diameter of the reamer, the bit diameter is used instead. A Non-Intersecting Utilities Error is generated when the bore crosses above or below a non-intersecting utility. The bore planning facility determines this situation by removing the vertical component of the utility and bore and checking if they intersect in the horizontal plane.

After the bore is calculated, the operator can generate a number of reports and graphs, including bend radii, minimum cover graph, warnings and errors, and plan reports/graphs, to determine the validity and adequacy of the computed bore plan.

The bore planning facility analyzes the statistics of the calculated bore for various types of errors. For example, the bore planning facility determines, if applicable, whether it was possible to keep the first rod straight. The bore statistics are scanned for any discontinuities. The calculated bore consists of a series of segments that attempt to connect one bore path target to the next. If a segment is not capable of connecting to the next target, this segment will terminate at some offset relative to the next target and possibly in a different direction than the next target. These spatial displacement and angle differences are recorded.

All connecting segments have joints, even if they were successful. As such, the bore planning facility scans the list of joints to determine whether the horizontal or vertical distance is off by more that a pre-established threshold, such as 2 inches (0.0508 meters) or if the angle is off by a pre-established threshold, such as 0.2 degrees (0.017 radians). If so, the bore planning facility reports these errors as "misses."

After a bore is planned, the operator may enter the number of discrete samples per rod the operator wishes to view. The bore planning facility samples the bore plan at this rate and displays the results in a tabular form. This table provides the necessary location and direction information necessary for the operator or boring machine controller to follow the bore plan. It includes the following information for each sampled point: Length along the curving sub-surface bore path, Distance, Depth, Pitch, and Azimuth.

Data concerning the actual borehole as-built may also be entered into the bore planning facility. An operator can collect actual borehole data in different ways. One way involves the manual recording of as-built data obtained from a locator device As-built data entered manually may be edited. Alternatively, the bore planning facility can download data directly from a locator device.

Another aspect of the present invention concerns the provision of a graphical user-interface (GUI) which facilitates user interaction with the bore planning facility. FIGS. 11–30 depict several screen images of a GUI in accordance with one embodiment of the present invention. In general, a GUI according to this embodiment provides for the display of job site topography, surface water, utilities, and targets. Each of these elements can be quickly added to the display by selecting the item on a toolbar, placing the cursor at the desired location, and clicking the left mouse button. Topography, water, utilities, and targets may be moved on the screen by using a simple click and drag method. Topography, water, utilities, targets or target angles may be deleted by selecting a Delete (skull) icon from the tool bar, selecting the element to be deleted from a pop-up menu, and clicking on the desired item.

If the cursor is placed over an item, such as a utility, and the cursor doesn't move for 1.5 seconds, a quick info box appears that displays information about that item. Right-clicking an item brings up a dialog box with the selected item ready for editing. Dragging a target automatically updates the bore in real time. The scaling along the distance axis can be adjusted so that the entire plan fits on 1 to 20 screens. This is accomplished using a Zoom button. A gold cross in used in the side view to set vertical scaling. The vertical scale always adjusts so that the gold cross is visible in the side view.

Two blue boxes are displayed that have aspect ratios of 1:1 Distance:Height and 1:1 Distance:Left/Right, respectively. The blue boxes also indicate the display aspect ratios between the Distance, Left/Right, and Height. Utilities are displayed in the industry standard color for that utility type. The reference origin is marked with a (0,0) symbol. The last 30 actions (add, modify, delete) can be undone using an Undo button.

Multiple languages are also supported, such as eight languages for example (e.g., English, French, German, Italian, Dutch, Spanish, Danish and Portuguese). Planning a bore may be performed using a first selected language, for example, and printouts of the plan may be provided in any of the supported languages. Pitch and Azimuth may be displayed in terms of %slope or degrees. Rod bend may be entered in terms of bend radius, distance to make 90° turn, or %slope change per rod. Distance, Height, Depth, and Left/Right values can be individually configured as meters, centimeters, feet, inches, or feet and inches.

Various textual, data, and graphical reports may be selected and generated by a user. Such reports include minimum cover graphs, plan and as-built reports which may include sonde problem data, fluid volume reports, and tabular data reports that include topography, targets, utilities, plan and as-built data.

Figure 11:
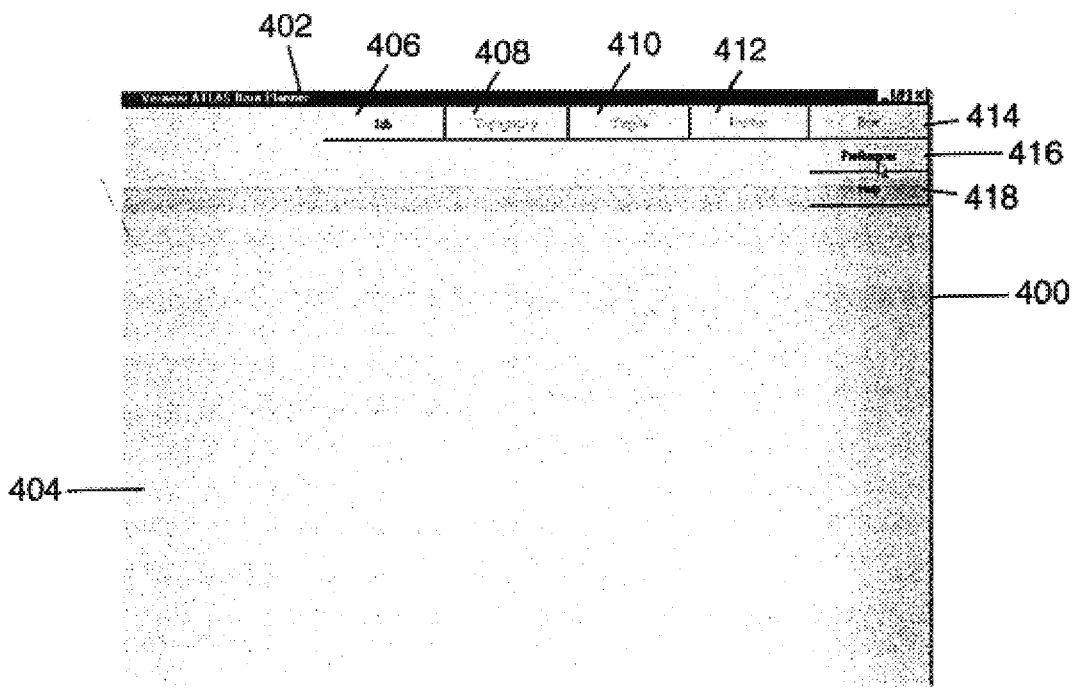
FIG. 11 depicts a menu of a user-interface that facilitates automated development of a bore plan in accordance with an embodiment of the present invention.
Figure 12:
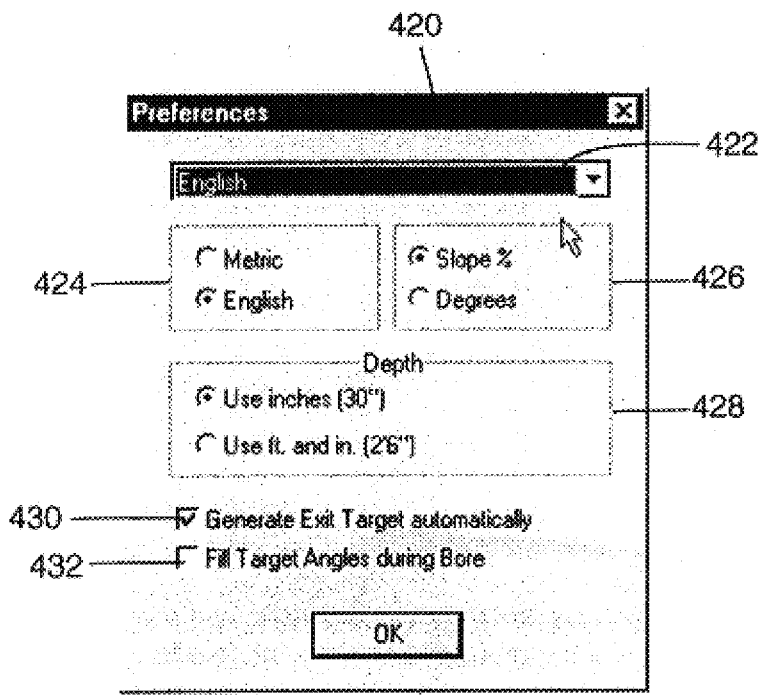
FIG. 12 depicts a dialog box which allows a user to establish various preferences of an automated bore planning program in accordance with an embodiment of the present invention.

FIG. 11 depicts a main menu screen 400 which includes a menu bar 402 and a canvas region 404. The menu bar 402 includes a number of buttons, including a Job button 406, a Topography button 408, a Targets button 410, a Utilities button 412, a Bore button 414, a Preferences button 416, and a Help button 418. Activation of one of these buttons provides for a number of functions and operations associated with the activated button.

Activation of the Preferences button 416, for example, results in presentation of a Preferences dialog box 420. The Preferences dialog box 420 allows the user to select the language by clicking on a drop-down menu 422. The units of measure and angular format may be selected by use of the Metric and English buttons of Units panel 424. Measurement units of Depth may be selected using Depth panel 428.

If English measurement units are chosen, the Depth can be displayed in inches or in feet and inches.

If the Generate Exit Target Automatically box 430 is checked, the bore planning facility will find the closest exit point from the last underground target automatically. If the last target input by the user is on the surface, the program will not attempt to find the closest exit point. If box 430 is not checked, the program will end the bore at the last target input by the user, even if underground. If the Fill Target Angles During Bore box 432 is checked, the bore planning facility will store the program-determined target Pitch and Azimuth angles in a Target dialog box (see FIG. 17).

If another bore is attempted, the program will use the angles saved in the Target dialog box. If the user desires to have the program recalculate the angles, the Target angles and Entry Angle value in the Job dialog box (see FIG. 13) must first be deleted. When box 432 is not checked, the Pitch and Azimuth angles, except for the Entry Angle and Pitch as determined by the program, will not be saved in the Target dialog box. In this case, the Pitch and Azimuth angles are recalculated every time a bore is attempted.

Figure 13:
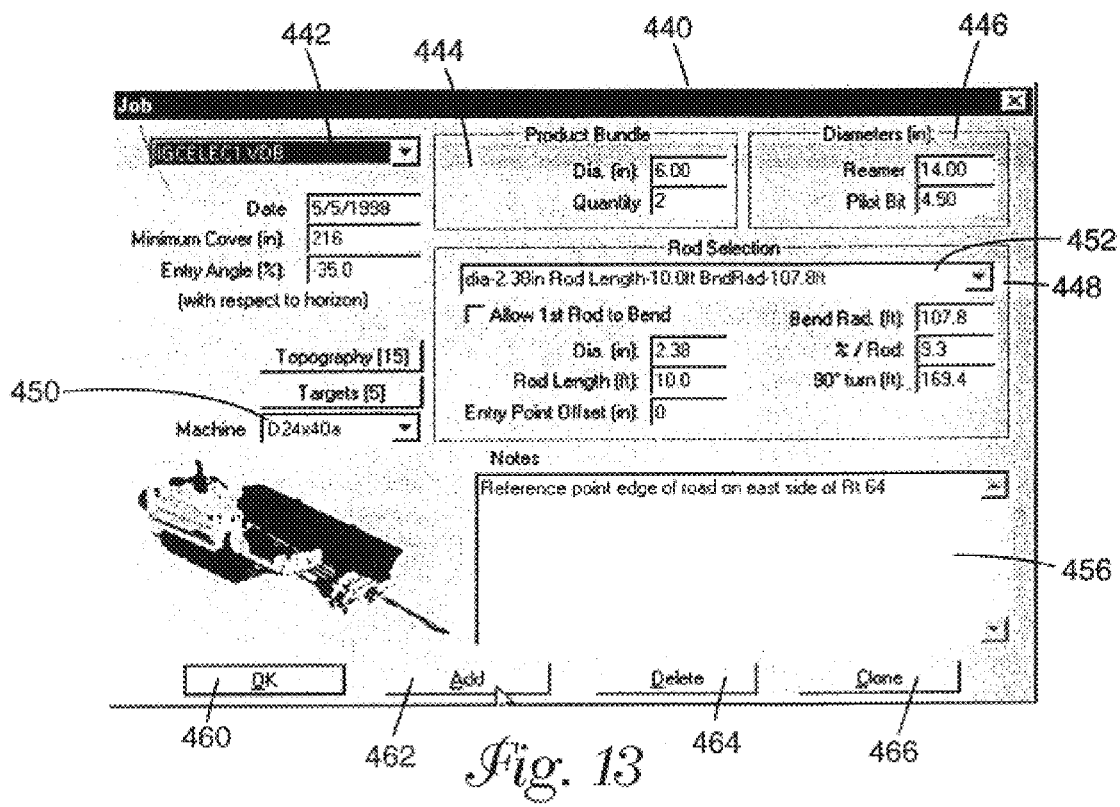
FIG. 13 depicts a dialog box which allows a user to specify various parameters that define a particular boring job in accordance with an embodiment of the present invention.

FIG. 13 is a depiction of a Job dialog box 440, which is presented to the user upon activation of the Jobs button 406 shown in FIG. 11. The Job dialog box 440 is used to input and/or display specific information concerning a particular job, such as machine used, rods used, and product information, for example. Activating the drop-down menu 442 displays all jobs stored in the active directory. These jobs can be loaded by double clicking on the desired job. A user may enter the name of a new or previously defined job using a drop-down menu 442 and clicking on the OK button 460. The job name will appear in the job menu 442 and the current date will be displayed in the Date window. A job may be selected, added, deleted, or cloned using buttons 460, 462, 464, and 466, respectively. Clicking on the Clone button 466 results in copying of currently stored topography, target, and utility information to another job file.

Pressing the tab key allows the user to scroll through the available windows in the Job dialog box 440 for data input. The user can also double click in the desired window and input only the data needed. The current date is automatically displayed in the Date window when adding a new job. Otherwise, the date the job was created will be displayed. Minimum ground cover, expressed in terms of inches or centimeters, required for job, if applicable, is entered into a Minimum Ground Cover window. The minimum cover value, if one is entered, is used to construct a Minimum Cover graph.

Figure 14:
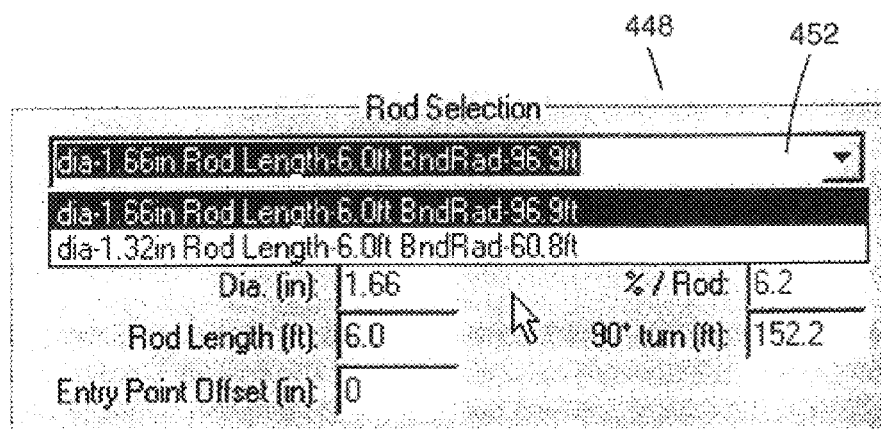
FIG. 14 depicts a drop-down menu which allows a user to select various drill rod parameters for a particular boring job in accordance with an embodiment of the present invention.
Figure 15:
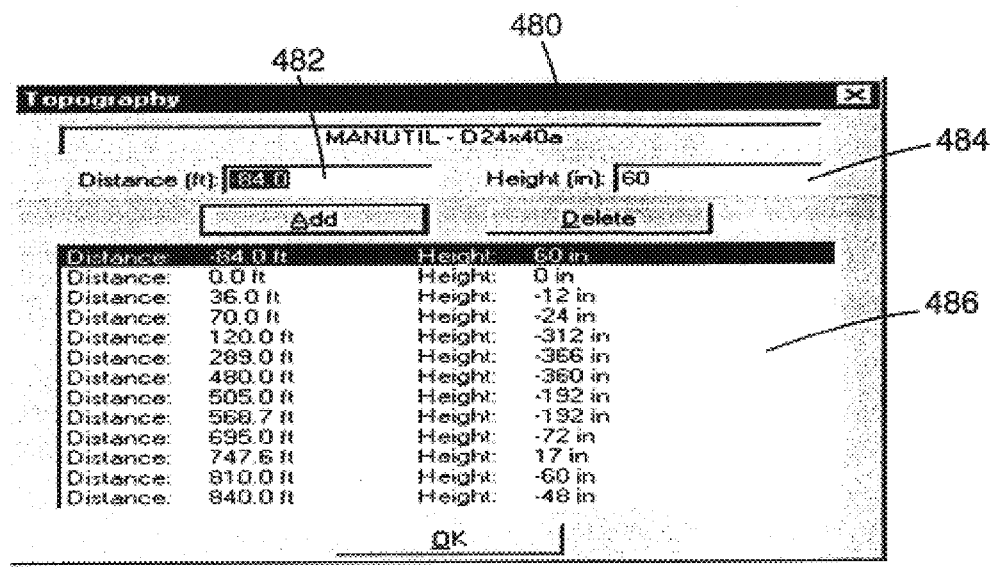
FIG. 15 depicts a dialog box which allows a user to establish the topography of a bore site in accordance with an embodiment of the present invention.

The drill rack angle, expressed in terms of percent (%) or degrees with respect to the horizon, may be entered, if applicable, into an Entry Angle window. If this window is left blank, the bore planning facility calculates optimum rack angle based on bore layout and the machine rack angle range. A Machine drop-down menu 450 allows the user to select a machine to be used for the job. Activating the Machine menu 450 presents a list of available machines to the user. Upon selection of certain machines, the available drill rod sizes for the selected machine are made available at the Rod Selection window/menu 452, as is depicted in FIG. 14. For other machines, a selection of drill rods are made available at the Rod Selection window/menu 452. If the rod being used is not displayed, the user can manually input this information in the Rod Selection window/menu 452.

The Rod Selection panel 448 allows the user to input additional information concerning the rods used for the selected job. If the Allow 1$^{st}$ Rod to Bend box is checked, the bore planning facility allows the first drill rod to bend when computing a bore. When this box is not checked, the first drill rod will not be allowed to bend in the bore computations. Shallow installations, for example, typically require that the first rod be allowed to bend.

The Diameter window presents the diameter of the rod selected in terms of inches or centimeters. The diameter of non-standard rods must typically be input manually. The Length window displays the length of the rod expressed in terms of feet or meters. Rod length is typically entered manually when a non-standard rod is chosen.

With the first rod fully retracted, the distance from the tip of the drill head to the entry point defines an Entry Point Offset, which may be entered using the Entry Point Offset window. If the drill head is above the surface with the first rod fully retracted, the Entry Point Offset is a negative number. If the drill head is below the surface with the first rod fully retracted, the Entry Point Offset represents the length of drill head below the surface and is a positive number. Rod diameter, rod length, and minimum bend radius may also be displayed in the Job dialog box 440.

The bend radius parameter is an important input parameter. The bore planning facility uses the bend radius to form the curves along the bore path. There are three possible job-related limitations that must be considered when selecting the right bend radius. These limitations are drill rod allowable bend radius, product (utility) allowable bend radius, and steering capability in the soil or rock at the job site. Of the three limitations, the steering capability is the most difficult to determine. The bend radius that is the most restrictive should be chosen in most cases. The bend radius is displayed in three different formats. A change made in one format will automatically be recalculated in the other two formats.

The user may input the desired bend radius in any one of the three following formats. The Bend Radius format displays the minimum bend radius of the rod or product in terms of feet or meters. The percent-of-Rod (%/Rod) format displays bend radius in terms of the maximum deflection from a straight line of a single rod or a length of product equal to the chosen rod length/product. This is measured in percent slope or degrees. It is important to note that the % slope value is defined with respect to the horizon. A slope change from 0% to 5%, for example, is much greater than a slope change from 40% to 45%. When using degrees (°), the change in direction for say 5° is the same at any inclination. The 90° Turn format displays bend radius in terms of the length of rod or product necessary to make a 90° turn. This is measured in terms of feet or meters.

Product information may be entered in widows provided on a Product Bundle panel 446. The diameter, expressed in units of inches or centimeters, and quantity of product bundle being installed (e.g., pipe, cable, etc.) may be entered into appropriate windows. The product bundle diameter data is used to calculate the amount of ground cover over the utility. The quantity of product in the bundle being installed is used for informational purposes.

The diameter, expressed in units of inches or centimeters, of the backreamer to be used may be input using a window provided in a Diameters panel 446. When the bore planning facility calculates a bore, the program uses this diameter data when checking for clearance around obstacles and minimum ground cover. The program also uses this diameter data to calculate the volume of the backreamed hole.

The diameter of the drill bit, in inches or centimeters, used for the pilot hole may also be entered. The program uses this diameter data to calculate the volume of the pilot hole. Any special job notes, such as customer name, location of job, etc., may be entered in a Notes window 456. This information is typically printed on the first sheet of a Bore Plan report.

The topography of the job site may be defined by clicking on the Topography button 408 shown in FIG. 11. Clicking on the Topography button 408 activates the Topography dialog box 480 shown in FIG. 15. The Topography dialog box 480 is used to input topographical information along the bore path. All distance measurements are defined with respect to a reference point of Distance=0, Height=0, and Left/Right=0. This reference point should be easily recognizable on the job site and must be able to be identified in the future to locate the product being installed.

As was discussed previously, this reference point is identified as the job site reference, and may represent the drill stem entry point, a bench mark, a permanent land mark, etc. This point is also located on a reference line. The reference line is a horizontal line through the job site reference. This reference line may be along the bore path, a wall, road or other landmark on the job site. A topography point of Distance=+35' and Height=+12", for example, indicates that this point is 35" down the reference line in the direction of the bore path and 12" above the job site reference. A point of Distance=−20" and Height=−24" is 20' behind and 24" below the job site reference. It is desirable to add a topography point behind the entry point and beyond the exit pit or last drill target to show the "lay of the land" where the rig will be placed and where the product may be laid out.

To add a topography point, the user clicks a Distance window 482. The user then types in the Distance from the job site reference to the point being entered and then hits the tab key. The Height window 484 then becomes highlighted. The user may enter the Height followed by pressing of the tab key. To delete any point, the user clicks on the desired line of data in the window 486 in order to highlight the selected line of data. The user then clicks on the Delete button. When all points are entered, the user clicks on the OK button. This typically brings the user back to the Job dialog box 400 shown in FIG. 11.

Figure 16:
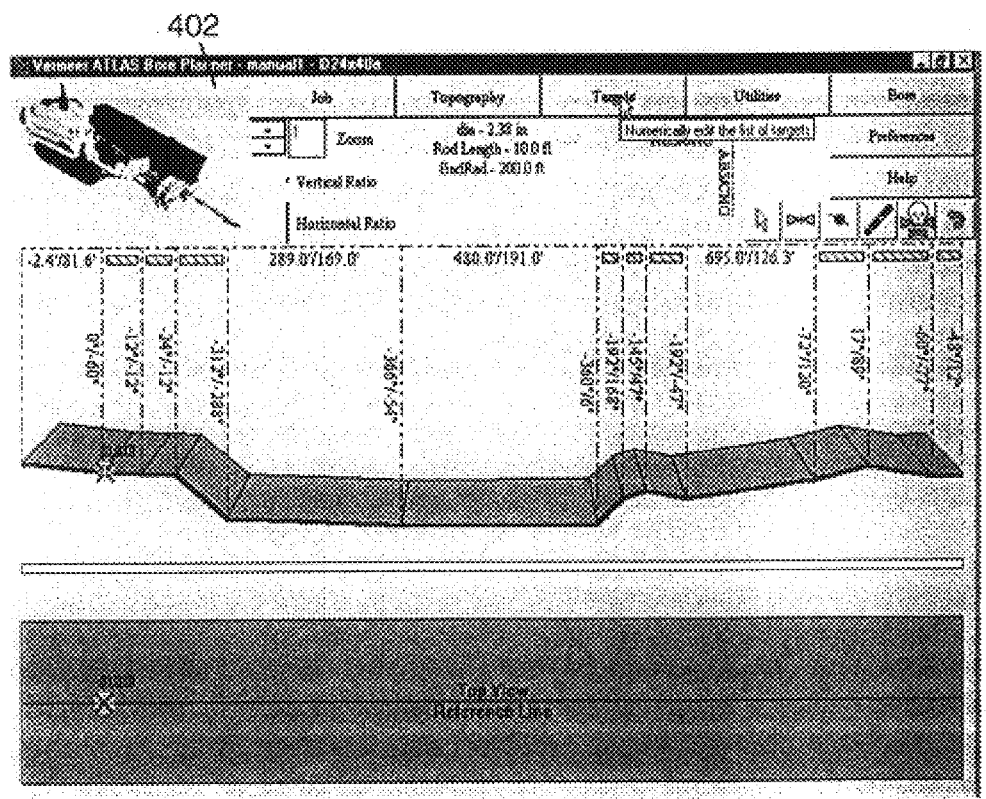
FIG. 16 is a graphical representation of a bore plan established using an automated bore plan development approach in accordance with an embodiment of the present invention.

Turning now to FIG. 16, there is depicted a graphical representation of a job site with topographical points displayed therein. In the middle of the screen, the elevation or side view of the job site is displayed. This view has a three-dimensional effect. Near the bottom of the screen, the top view of the job site is displayed. The size of the side view and top view may be At respectively changed by dragging the white bar separating the two views upward and downward.

Figure 17:
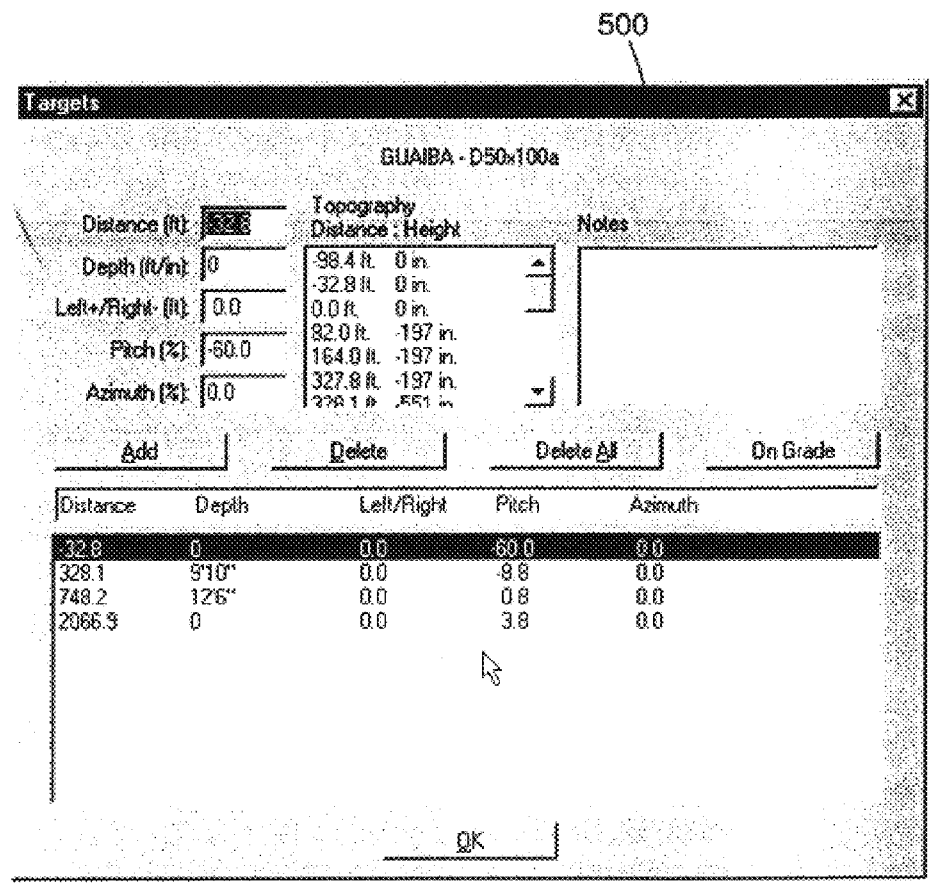
FIG. 17 depicts a dialog box which allows a user to establish targets of a bore plan in accordance with an embodiment of the present invention.

Bore path targets can be entered using the Targets dialog box 500 illustrated in FIG. 17 upon activation of the Targets button 410 shown in FIG. 11. Clicking on the Add button allows the user to define a bore path target. A Distance window allows the user to enter a Distance as measured from the job site reference, in feet or meters, to a point of interest along the reference line. The Depth window allows entry of the Depth of a drilling target in units of inches, feet and inches, or centimeters. All Depths are referenced with respect to the local topography directly above the target and is equivalent to the drill head locator depth readings. Depth is not referenced to a horizontal line. A Left/Right value may be entered which represents the left/right location of the drilling target, in feet or meters, from the reference line. The Depth of the target is defined with respect to the topography along the bore path above the target. Any change in location in left or right may require the user to redefine the topography above and the Depth of that point.

A Pitch window allows the user to enter a Pitch value, which represents the pitch of the drill head measured in percent slope or degrees. This is equivalent to the pitch reading on the locator. This value is optional. If left blank, the program calculates Pitch based on location of adjacent targets and minimum bend radius selected in the Job dialog box 440 shown in FIG. 13. Azimuth data may be entered. Azimuth in this context refers to the side-to-side deviation from the bore path measured in percent or degrees, also referred to as heading. This value is optional, If left blank, the program calculates azimuth based on location of adjacent targets and minimum bend radius selected in the Job dialog box 440. All or selected targets may be deleted by clicking on the Delete All and Delete buttons, respectively.

Figure 18:
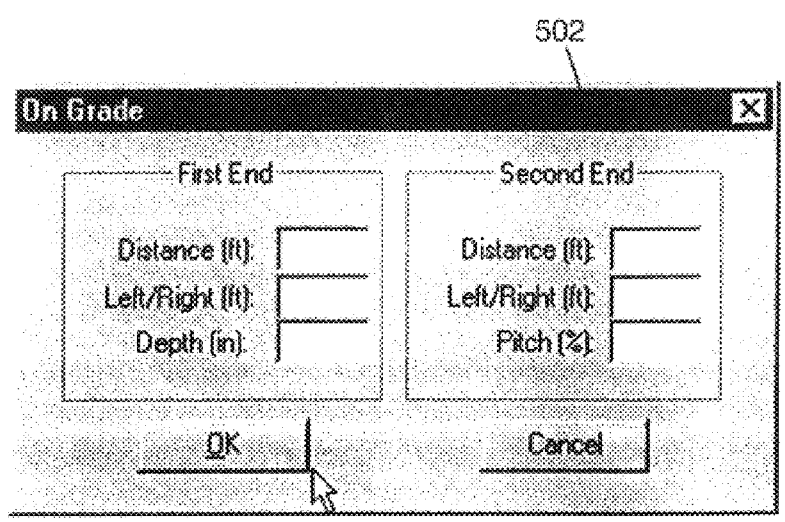
FIG. 18 depicts a dialog box which allows a user to establish grade parameters of a bore plan in accordance with an embodiment of the present invention.

A user may click on the On Grade button to activate an On Grade dialog box 502, as is shown in FIG. 18. The On Grade function allows the user to plot a bore while maintaining a constant pitch. Data concerning a First End and a Second End of the constant pitch section of the go bore may be entered into the On Grade dialog box 502. The Distances from the job site reference along the reference line to the beginning and end of the constant pitch section of the bore are entered into the First and Second End Distance windows, respectively. The Left/Right offsets of the first and second ends relative to the reference line are entered into the First and Second End Left/Right windows, respectively. The required Depths at the beginning and end of the constant pitch section of the bore are entered into the First and Second End Depth windows, respectively.

When data entry into the On Grade dialog box 502 is completed, the user clicks on the OK button, which returns the user to the Targets dialog box 500 shown in FIG. 17. After inputting all target information, the user may click on the OK button to return to the Job dialog box 440 shown in FIG. 13.

Figure 19:
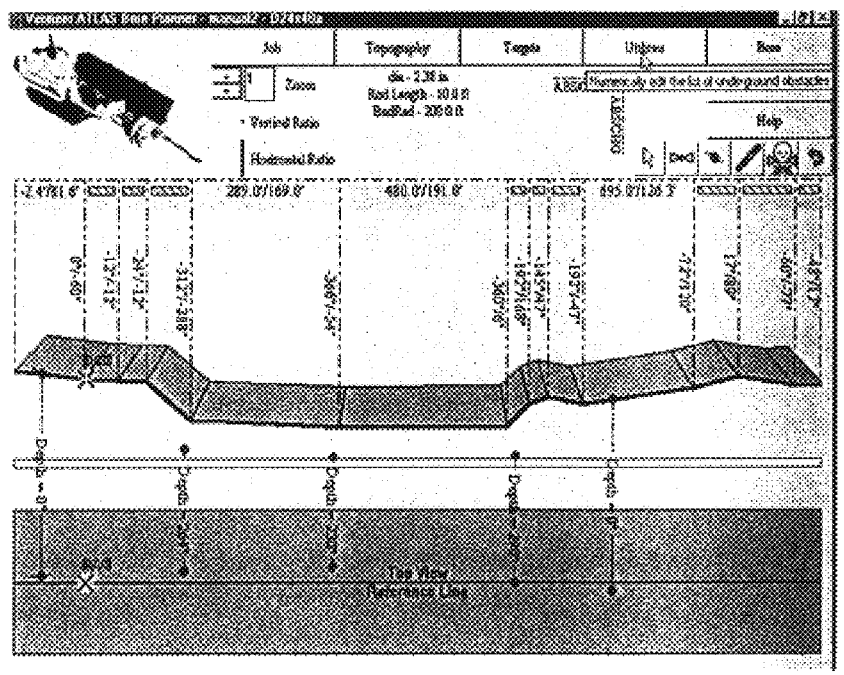
FIG. 19 is a graphical representation of a bore plan including targets established using an automated bore plan development approach in accordance with an embodiment of the present invention.

FIG. 19 is a graphical display of a job site with topographical and target points presented therein. The horizontal numbers displayed above the elevation drawing identify the horizontal distance from the job site reference to that topography point along the reference line and the horizontal distance from the previous topography point along the reference line. For example, 100'/25' means that that topography point is 100' from the job site reference along the reference line and 25' from the previous topography point along the reference line.

Vertical measurements are depicted in a similar way. For example, 23"/–10" means that this topography point is 23" above the job site reference elevation and 10" below the previous topography point. The ABS/CHG text directly below the Utilities button identifies that the number to the left of or above the slash (/) is the absolute Distance or Height from the job site reference and reference line. The number to the right of or below the slash (/) is the Distance or Height difference from the previous topography point. The buttons on top of the page allow the user to go back to the Topography and Target dialog boxes 480 and 500 to make changes as needed.

Figure 23:
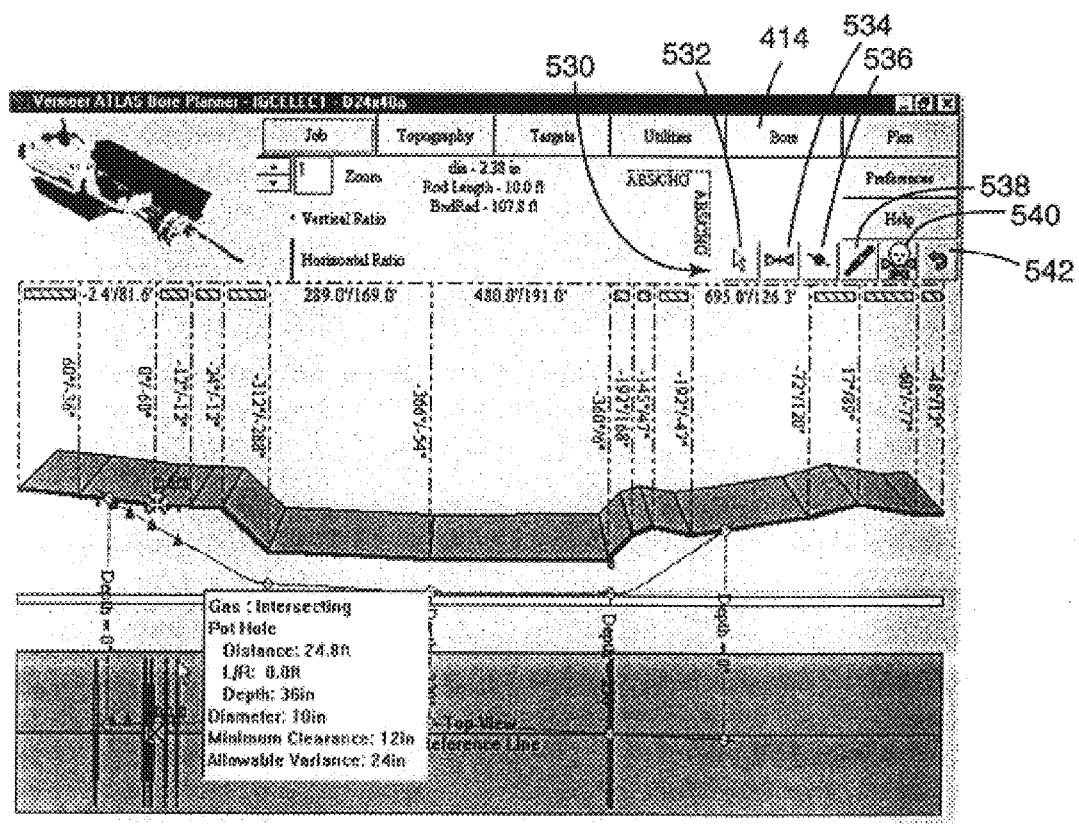
FIG. 23 is a graphical representation of a bore plan including targets and utilities established using an automated bore plan development approach in accordance with an embodiment of the present invention.

Targets and topography points can be moved on screen using a Quick Move feature by clicking on the desired point and dragging it to a new location. A "Quick Info" window, such as that shown in FIG. 23, shows the location and Height of a topography point and the location, Depth, Left/Right offset, Pitch, and Azimuth of a target while the point is being moved.

Figure 20A:
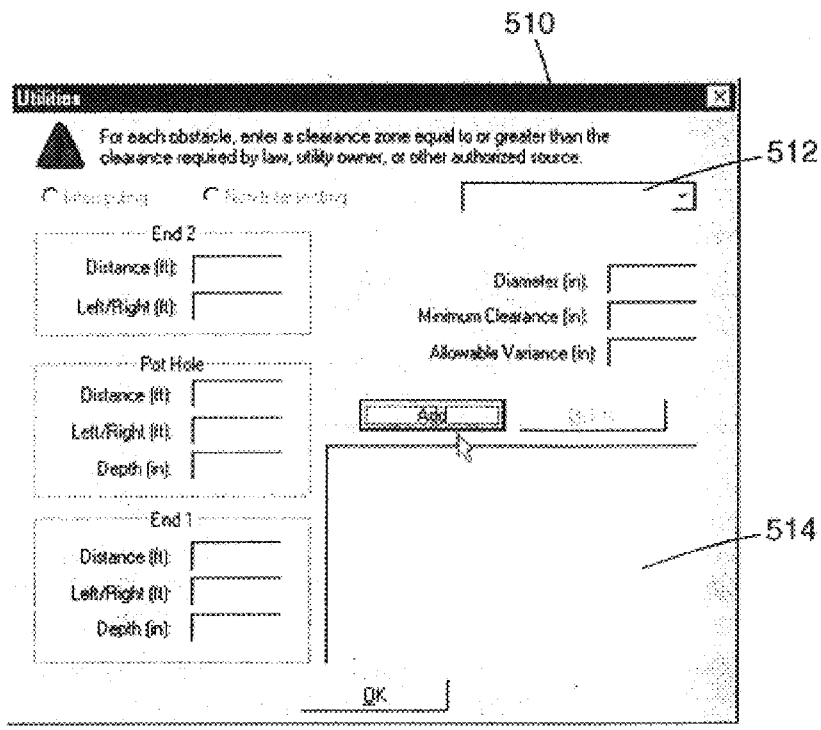
FIG. 20A depicts a dialog box which allows a user to define a first category of utilities for a bore plan in accordance with an embodiment of the present invention.
Figure 20B:
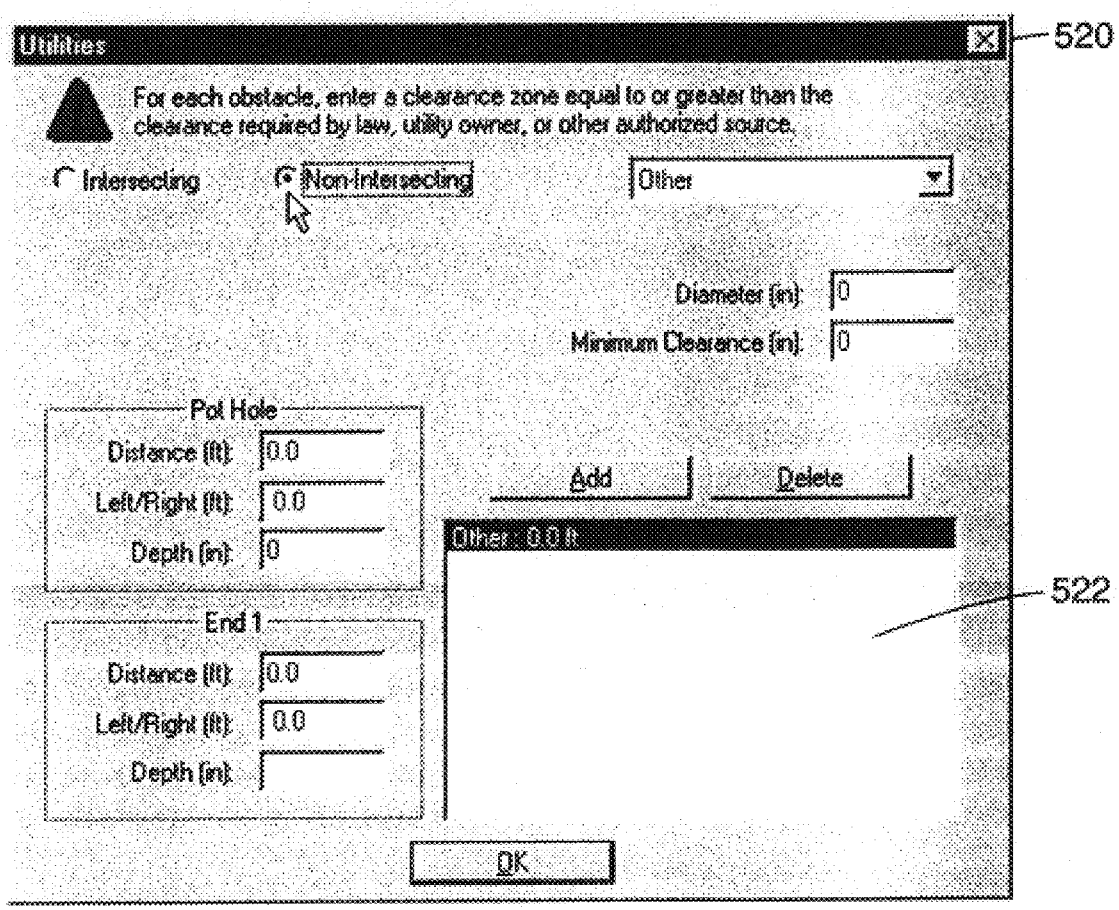
FIG. 20B depicts a dialog box which allows a user to define a second category of utilities for a bore plan in accordance with an embodiment of the present invention.

Clicking on the Utilities button 412, shown in FIG. 11, allows the user to input known existing utilities into a Utilities dialog box 510, shown in FIG. 20A and Utilities dialog box 520, shown in FIG. 20B. The user clicks on the Add button to add a utility. The user defines the utility as either an intersecting utility, using Utilities dialog box 510 shown in FIG. 20A, or a non-intersecting utility, using Utilities dialog box 520 shown in FIG. 20B. A drop-down menu 512 provides the user with the names of various types of utilities. The user clicks on the type that best describes the utility and then hits the tab to move to the next data input window.

FIGS. 21A and 21B are elevation and top views, respectively, of an intersecting utility and the various parameters that are defined in connection therewith using the Utilities dialog box 510 shown in FIG. 20A. In general, existing utilities must be located by the most accurate means available. The location of a segment of the utility must be identified for use by the bore planning facility. This segment must include the point where the bore path crosses the utility. The utility is identified in the Utilities dialog box 510 by information about "End-1" of the utility, "End-2" of the utility, and by the "Pot Hole". The Pot Hole location represents the point where the bore path crosses above or below the utility. The Pot Hole location is typically established by digging a hole proximate the utility and validating the physical location of the utility.

A Pot Hole, as is depicted in FIGS. 21A and 21B, is defined by an input Distance to the Pot Hole with respect to the job site reference as measured along the reference line (D1). The user inputs a Left/Right offset with respect to the reference line (L/R1). The Depth of the utility below the surface at the pot hole is entered in units of inches, feet and inches or centimeters. End-1 Distance and Left/Right values are entered by the user. The End-1 Distance represents the Distance to End-1 with respect to the job site reference as measured along the reference line (D2). The Left/Right offset represents the left/right offset with respect to the reference line (L/R2).

An End-2 Left/Right value is further entered by the user. This value indicates how far an obstacle should extend beyond the Pot Hole, and represents the left/right offset with respect to the reference line (L/R3). If the Pot Hole and End-1 Left/Right offsets are the same, this option will not be available and the Distance option becomes available to indicate where End-2 of the utility is located. The End-1 Distance represents the distance from the job site reference to the End-2 location as measured along the reference line. This describes a utility that runs along the bore path, either above or below it.

Once the user inputs the location and type of utility information into Utility dialog box 510, the following information must be entered. The diameter of the utility in inches or centimeters is entered by the user. The user also enters the minimum clearance zone around the utility. This is measured in inches or centimeters. The minimum clearance is measured with respect to the exterior of the utility. A warning message instructs the user that the clearance zone must be equal to or greater than the clearance required by law, utility owner or other authorized source.

The allowable variance is entered by the user, in units of feet and inches or centimeters. The allowable variance represents the area around the center of the Pot Hole that the bore path can drift before having to reconsider the location of the Pot Hole. When the bore planning facility calculates a bore, a message will appear warning the user if this allowable variance has been exceeded. As utilities are added, a list of the utilities and their Distances from the job site reference will appear in window 514. A utility may be deleted by clicking on the desired utility on the list and then clicking on the Delete button.

FIGS. 22A and 22B are elevation and top views, respectively, of a non-intersecting utility and the various parameters that are defined in connection therewith using the Utilities dialog box 520 shown in FIG. 20B. Non-intersecting utilities are utilities that are not expected to intersect the drill path. Non-intersecting utilities are identified by two ends: the "Pot Hole" and End-1. The Pot Hole Distance, as applicable to non-intersecting utilities, refers to the distance to the Pot Hole or one end of the utility as measured along the reference line (D1). The Left/Right offset relative to the reference line (L/R1) is entered by the user. The Depth of utility below the surface at Pot Hole (Depth 1) is also entered.

The End-1 Distance, as applied to a non-intersecting utility, refers to the distance to End-1 of the utility as measured along the reference line (D2). The user enters the End-1 Left/Right offset with respect to the reference line (L/R2). The Depth of the utility below the surface at End-1 (Depth 2) is also entered in units of inches, feet and inches, or centimeters. The diameter of the utility and minimum clearance zone required around the utility are also entered by the user. The minimum clearance is measured from the exterior of the utility. As non-intersecting utilities are added, a list of the utilities and their Distances from the job site reference appear in window 522. When all utilities are identified, the user may click on the OK button to display elevation and top views of the utilities defined for the job site, a depiction of which is shown in FIG. 19.

Utilities can be moved on screen by clicking on the desired utility and dragging it to a new location. A "Quick Info" window, as can be seen in FIG. 23, shows the location, Depth and Left/Right offset of the utility while it is being moved. As soon as the mouse button is released, the appropriate Utility dialog box will appear with that utility highlighted so that the user can fine tune its position. Target, utility, and topography information can be seen by placing the cursor on that target, utility or topography point for two seconds. A "Quick Info" window will appear which displays the information associated with the element of interest.

With continued reference to FIG. 23, all topography points, target points, and utilities can be added, modified or deleted using the tool bar 530. Clicking on the Arrow Cursor 532 returns a tool to the tool bar and regains the arrow cursor. If the cursor is placed on a feature (target, topography point, etc.) for two seconds, as was discussed above, a "Quick Info" window will appear for that feature. The "Quick Move" feature allows the user to place the cursor on a feature, hold the left mouse button, and drag that feature to a new location. The "Quick Info" window displays the position of the feature as you move the feature with Quick Move. If the user right clicks on a target or topography point, the appropriate data dialog box appears with that feature highlighted. If the user single clicks on a utility, the Utilities dialog box will appear with that utility highlighted.

A Topography Point icon 534 allows the user to Quick Insert a topography point. The user can add a topography point anywhere along the bore path by clicking on this icon 534 and moving it to the desired location. The user clicks the left mouse button again once the desired location has been found,. The "Quick Info" window provides location information while the icon is being moved. Once the user has located the point via the mouse, the Topography dialog box may be invoked to permit fine tuning of the location.

A Target Point icon 536 allows the user to Quick Insert a target point. The user can add a bore path target by clicking on this icon 536 and moving it to the desired location along the bore path. Once the desired location has been found, the user clicks the left mouse button again. The "Quick Info" window displays the location of the target while it is being moved. After the target is in place, the user can right click the mouse to display the Target dialog box to fine tune the location.

A Utility icon 538 allows the user to Quick Insert a utility. A menu appears to allow the user to specify the type of utility to be entered (e.g., CATV, Electric, Fiber, Gas, Other, Sewer, Telephone, Water, etc.). After selecting a Utility, the user moves the icon 538 to the desired location. The "Quick Info" window will display the location of the utility while it is being dragged. Once the desired location has been reached, the user clicks the left mouse button again. The Utility dialog box will automatically appear. The user specifies the utility as Intersecting or Non-intersecting, then verifies and fine tunes the Pot Hole and end location(s) information.

A Delete icon 540 allows the user access to the Quick Delete tool. A menu appears allowing the user to choose the feature to be deleted (e.g., Topography, Targets, Pitch/Azimuth, Utilities, etc.). The user selects the type of feature to be deleted. The Delete icon 540 is situated on the feature and the user clicks once to delete the feature. The Delete icon 540 remains active until another tool is selected by clicking once on another tool bar item.

An Undo icon 542 allows the user to Quick Undo the last action. Multiple Undo operations may be performed by holding the Shift key and clicking on the Undo icon 542. All changes made to the screen and Topography, Target and Utility dialog boxes will return to their previous values before the Bore button 414 was last clicked. Once the user has clicked the Bore button 414 and has re-planned the bore path, the user cannot undo any changes that were made prior to clicking the Bore button 414.

Figure 24:
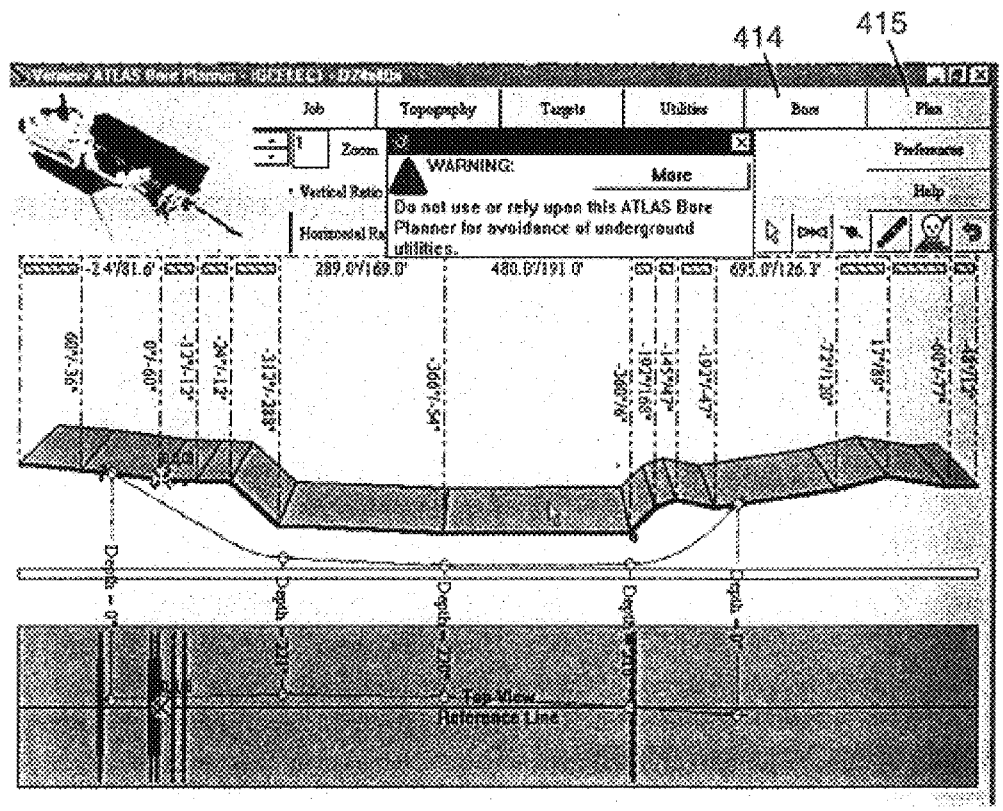
FIG. 24 is a graphical representation of a bore plan including a bore plan path established using an automated bore plan development approach in accordance with an embodiment of the present invention.

Referring now to FIG. 24, the user may attempt the bore by clicking on the Bore button 414. The bore planning facility uses the bend radius and backreamer diameter chosen in the Job dialog box to calculate the bore. If a Pitch or Azimuth is left blank, the program automatically calculates this data. The program will also find an entry point and exit point (if chosen in the Preference dialog box) if they have not been defined by the user. FIG. 24 shows the details of a successfully executed bore plan.

The user must understand the implications of the warning displayed on the screen after the bore is completed. The warning shown in FIG. 24 alerts the user that the bore planning facility results must not be relied upon for avoidance of underground utilities. An additional warning alerts the user that the bore planning facility results must be considered estimates until the exact locations of the utilities are obtained by the user, such as by use of commercially available locator systems and industry standard utility locating techniques.

Figure 25:
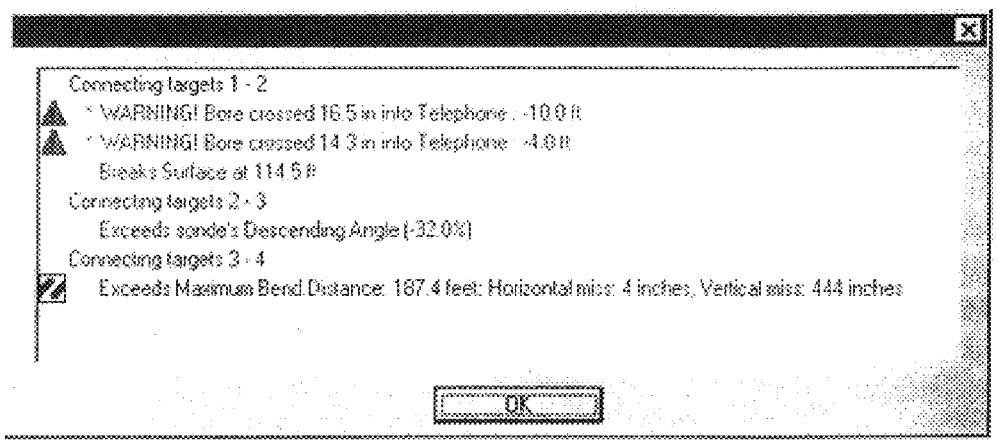
FIG. 25 illustrates warning messages associated with an unsuccessful bore plan in accordance with an embodiment of the present invention.

If the bore cannot be completed, a message will appear stating the reason or reasons. An unsuccessful bore may, for example, result from a violation of a minimum bend radius, collision with a utility, etc. A number of warning and error messages resulting from an unsuccessful bore are shown in FIG. 25. To address this situation, the user can add targets and/or adjust the bore path target locations, minimum bend radius or other job parameters and retry the bore. When a bore is successful, no messages will appear and the completed bore will be displayed in alternating red and blue segments each representing one rod.

Figure 26:
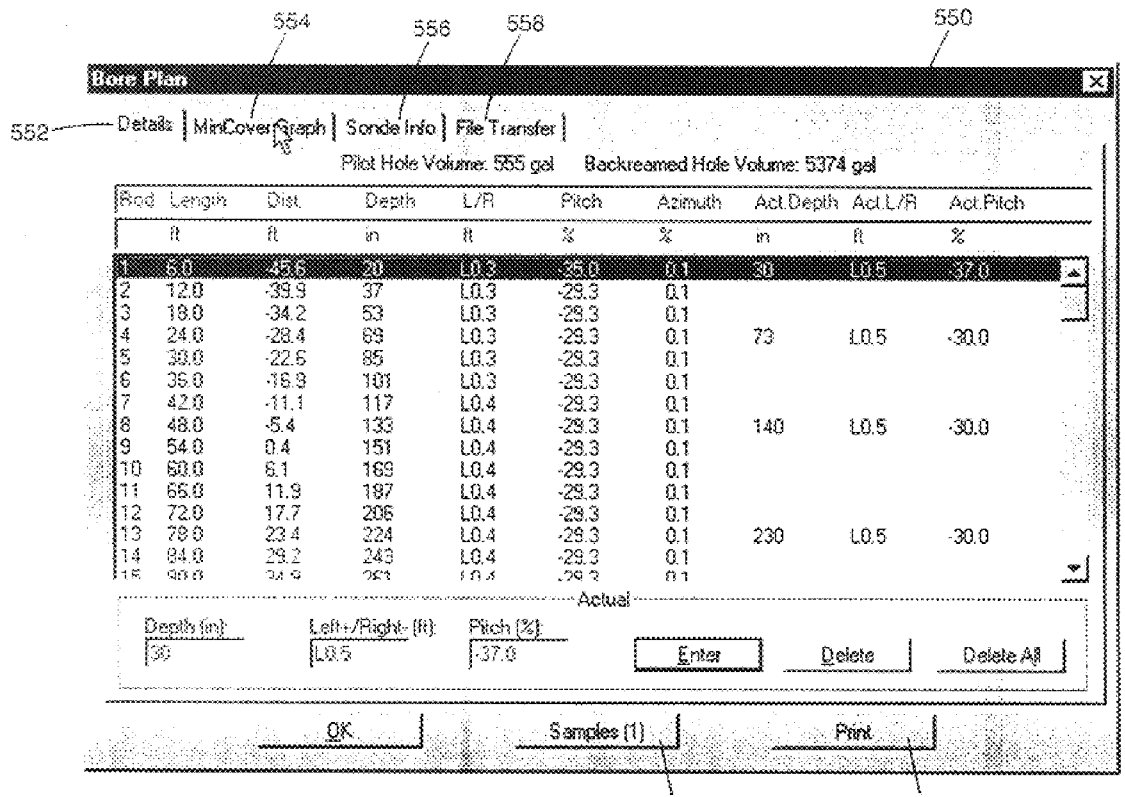
FIG. 26 depicts a dialog box which allows a user to view data and generate reports and graphs associated with a bore plan developed in accordance with an embodiment of the present invention.

Details of the bore plan may be displayed and printed out upon activation of a Plan button 415 shown in FIG. 24. Clicking on the Plan button 415 invokes a Bore Plan dialog box 550 shown in FIG. 26. The Bore Plan dialog box 550 allows the user to activate a Details button 552, a MinCover Graph button 554, a Sonde Info button 556, and a File Transfer button 558. Clicking on the Details button 552 results in the generation of a Bore Plan Report, tabulated data of which is shown in FIG. 26. This report includes the information needed to complete the bore as planned on-site. The report displays the pilot and back reamed hole volumes to be used in estimating mud volumes. The Bore Plan Report is often used in the field by the drilling crew to provide a rod-by-rod guide while drilling. For each rod along the bore path, the report displays the drill string Length, Distance from the job site reference, the Depth of the drill head, the Left/Right offset, drill head Pitch, and the Azimuth (heading).

The user may specify the number of samples (i.e., data points) per rod. A Samples per Rod dialog box (not shown) allows the user to change the number of samples (data points) per rod. The bore planning facility report defaults to one sample (data point) per rod. The number in the brackets of the Samples button 560 indicates the number of samples (data points) per rod displayed on the Bore Plan Report. Selecting a number greater than I allows the user to fine tune the bore to get more frequent bore planning information. If, for example, the user selects 3 samples (data points) for a 15 foot rod, the Bore Plan Report will display 3 samples (data points) per rod at 5 foot intervals.

Figure 27:
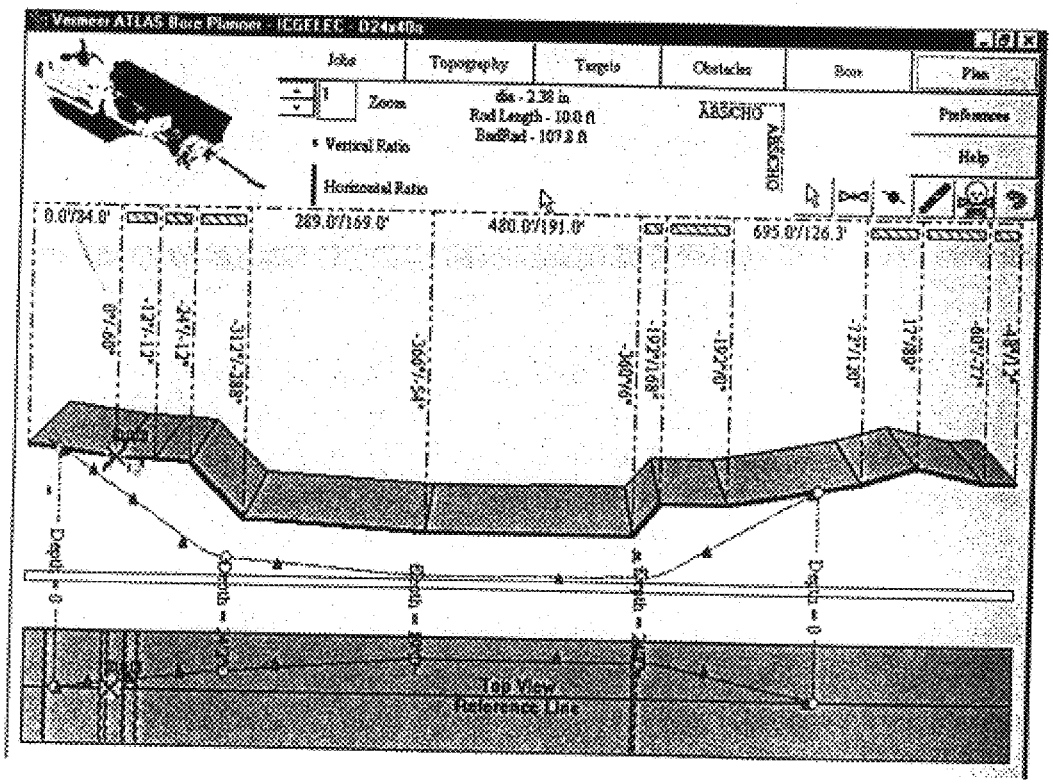
FIG. 27 is a graphical representation of a bore plan including a bore plan path and an actual "as-built" bore path developed in accordance with an embodiment of the present invention.

As-built data may be entered while drilling or after the job is completed to create an as-built map. The as-built data points appear as magenta triangles on the screen. The as-built map can be printed out in graphical and tabular form along with the planned bore path. When the Bore Plan Report is printed out, the report includes three open columns for actual depth, actual Left/Right data, and actual pitch data. If the as-built data is to be entered after the job is completed, a crew member can write the actual Depth, Left/Right and Pitch in these three open columns as the drilling progresses. The user can input this information after completion of the bore and maintain it for future reference. This data may be uploaded into the bore planning facility from a locator using an appropriate interface. FIG. 27 shows how as-built data is graphically displayed along with bore plan data. A magenta triangle is placed on the bore path in the Bore screen for each "actual" data value entered. This can be used to compare the planned bore to the actual bore in the field.

Figure 28:
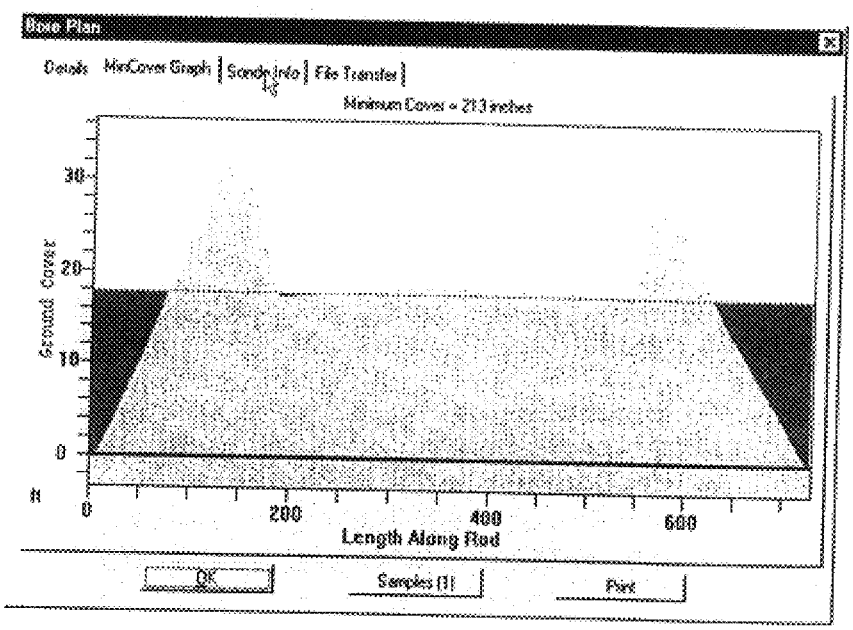
FIG. 28 is a graphical representation of a minimum ground cover graph for a particular bore plan developed in accordance with an embodiment of the present invention.

A Minimum Cover Graph may be generated by clicking on the MinCover Graph button 554 shown in FIG. 26. This graph, as is shown in FIG. 28, displays the amount of ground cover over the product (utility) being installed. Note that the Minimum Cover Graph is presented with respect to Length along rod (i.e., a function of rod length), and not Distance along the reference line. A solid black line represents the drill string, a gray area represents the ground cover above the top of the product (utility) being installed, a dashed line represents the required ground cover, and red areas represent areas where the ground cover is less than the Minimum Cover value entered in the Job dialog box. This ground cover is measured from the ground surface to the top of the product bundle diameter.

Sonde Information may be obtained by clicking on the Sonde Info Button 556 provided in the Bore Plan dialog box 550. The user may input sonde (i.e., transmitter) pitch limits. For certain sonde/transmitter devices, the accuracy of the pitch reading may degrade beyond a certain slope. This critical slope may differ by device type and manufacturer, and may also depend on the direction of travel (i.e., positive or negative slope). If the sensitivity limitations of the sonde are known, this information may be input into a Sonde Information dialog box (not shown). If the Pitch exceeds the limits entered by the user, a message will appear after hitting the Bore button 414 stating that the Pitch exceeds the sonde's ascending/descending angle, $\alpha$, where $\alpha$ is the pitch of the sonde at that point. The bore will be plotted using the pitch required to complete the bore. A warning will be displayed after the bore calculations are completed, thereby locating areas where this limit is exceeded. Also, the Bore Plan report will display an indication next to the pitch that exceeds the values entered. This alerts the locator operator in the field that sonde pitch readings may not be accurate at these locations.

File transfer functions can be accessed by activation of the File Transfer button 558 shown in FIG. 26. A File Transfer dialog box allows the user to perform various data export and import operations, such as exporting DXF formatted files into and out of the APB. Uploading and downloading of locator data may also be selected via the File Transfer facility.

In a further embodiment, a Locator Connect dialog box can be activated which allows the user to establish a communication link between the bore planning facility and a locator device or system. A locator device and manufacturer may by selected or specified by the user so that appropriate parameters are selected to configure the communications interface of the bore planning facility to enable reception of locator data, preferably in real-time, from a locator device.

In an alternative embodiment, down-hole electronics provided proximate the cutting tool may provide, alone or in combination with an above-ground locator, cutting tool location data which may be transmitted to the bore planning facility via a communication link established through the drill string or via the above-ground locator. As such, actual bore path data may be uploaded to the bore planning facility and displayed in real-time on a display of the bore planning facility or the locator device. By way of example, real-time acquisition of cutting tool location data by the bore planning facility provides for the real-time, dynamic graphical construction of the actual bore path, which may be compared with the plan path (see, e.g., FIG. 27).

A Print dialog box is invoked by activating the Print button 562 shown in FIG. 26. The bore planning facility can print out a variety of reports and graphs, including the following: Bore Plan report, Minimum Cover graph, the bore screen, the topography information page, the target information page, and the utilities information page. One or more of the printouts may include the following information: pilot hole and backreamed hole volumes; machine set up location with respect to the job site reference; notes entered on the Job dialog box; job name; machine type; entry angle; rod length, diameter and bend radius; starter rod length; version number of the program; and date and time of the printout.

Figure 31:
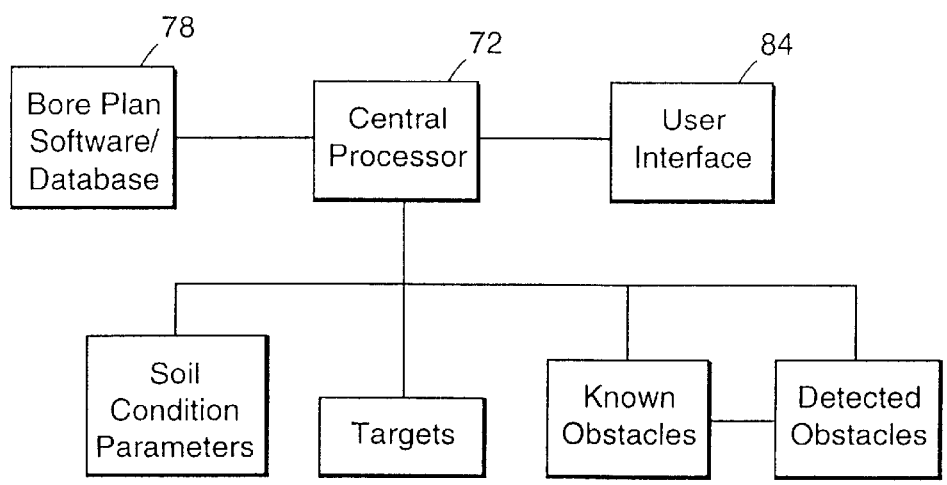
FIG. 31 is a block diagram depicting a bore plan development software and database facility which is accessed by a controller of a boring machine for purposes of establishing a bore plan storing and modifying the bore plan, and accessing the bore plan during a boring operation according to an embodiment of the present invention.
Figure 32:
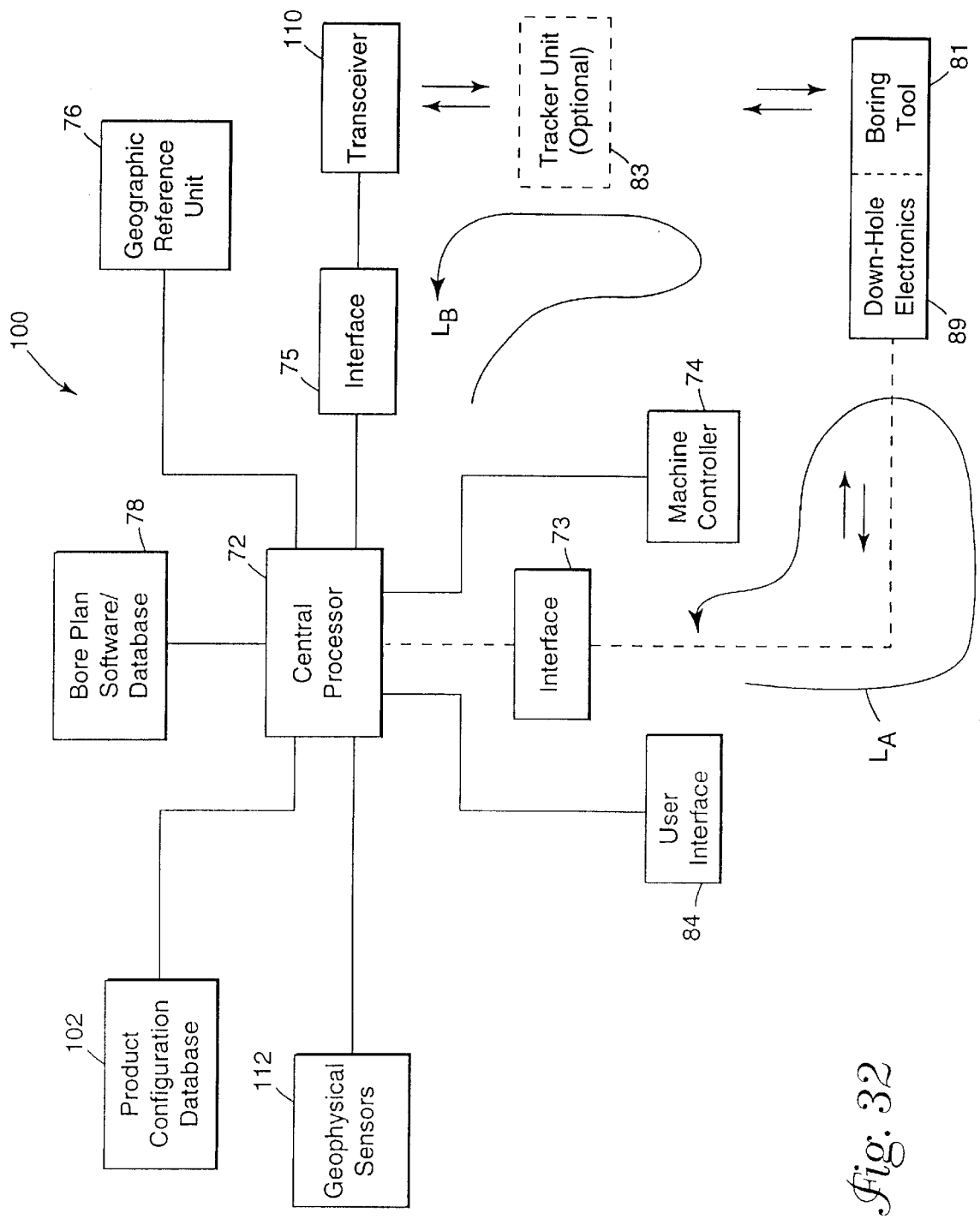
FIG. 32 is a block diagram of a system for controlling operations of a boring machine and boring tool in real-time according to an embodiment of the present invention.

In accordance with a further embodiment or the present invention, and with reference to FIGS. 30–32, the bore planning facility of the present invention may be employed as part of a control system for controlling an underground boring machine, such as a horizontal directional drilling machine. A boring machine control system may utilize the bore planning facility to enhance the automaticity of a boring operation. In addition to providing the functionality described hereinabove, a bore planning facility of the present invention may be enhanced to receive actual cutting tool location data from a variety of sources, including above-ground trackers/locators/repeaters and down-hole electronic sensors. For example, real-time geophysical data may be acquired and analyzed during excavation, such as from a Ground Penetrating Radar unit or seismic sensor unit provided in the cutting tool or above-ground. This data may be used to augment a pre-established bore plan if required or desired.

In FIG. 30, there is illustrated a block diagram of various components of a boring system, including bore planning software and/or database 78, that provide for real-time control of a boring tool in accordance with an embodiment of the present invention. In accordance with the embodiment depicted in FIG. 30, a boring machine 70 includes a central processor 72 which interacts with a number of other controls, sensors, and data storing/processing resources. The central processor 72 processes boring tool location and orientation data communicated from the boring tool 81 via the drill string 86 or, alternatively, via the tracker unit 83 to a transceiver (not shown) of the boring machine 70. The central processor 72 may also receive geographic and/or topographical data from an external geographic reference unit 76, which may include a GPS-type system (Global Positioning System), Geographic Reference System (GRS), ground-based range radar system, laser-based positioning system, ultrasonic positioning system, or surveying system for establishing an absolute geographic position of the boring machine 70 and boring tool 81.

A machine controller 74 coordinates the operation of various pumps, motors, and other mechanisms associated with rotating and displacing the boring tool 81 during a boring operation. The machine controller 74 also coordinates the delivery of mud/foam/air to the boring tool 81 and as modifications made to the mud/foam/air composition to enhance boring tool productivity. The machine controller 74 may also control rotation pump movement when threading a length of pipe onto a drill string, such as by use of an automatic rod loader apparatus of the type disclosed in commonly assigned U.S. Pat. No. 5,556,253, which is hereby incorporated herein by reference in its entirety.

The central processor 72 typically has access to a number of automated drill mode routines 71 and trajectory routines 69 which may be executed as needed or desired. A bore plan database 78 stores data concerning a pre-planned boring route, including the distance and variations of the intended bore path, boring targets, known obstacles, unknown obstacles detected during the boring operation, known/ estimated soil/rock condition parameters, and boring machine information such as allowable drill string or product bend radius, among other data.

The central processor 72 or an external computer may execute bore planning software 78 that provides the capability to design and modify a bore plan on-site. The on-site designed bore plan may then be uploaded to the bore plan database 78 for subsequent use. As will be discussed in greater detail hereinbelow, the central processor 72 may execute bore planning software and interact with the bore plan database 78 during a boring operation to perform "on-the-fly" real-time bore plan adjustment computations in response to detection of underground hazards, undesirable geology, and operator initiated deviations from a planned bore program.

A geophysical data interface 82 receives data from a variety of geophysical and/or geologic sensors and instruments that may be deployed at the work site and at the boring tool. The acquired geophysical/geologic data is processed by the central processor 72 to characterize various soil/rock conditions, such as hardness, porosity, water content, soil/ rock type, soil/rock variations, and the like. The processed geophysical/geologic data may be used by the central processor 72 to modify the control of boring tool activity and steering. For example, the processed geophysical/geologic data may indicate the presence of very hard soil/rock, such as granite, or very soft soil, such as sand. The machine controller 74 may, for example, use this information to appropriately alter the manner in which the thrust/pullback and rotation pumps are operated so as to optimize boring tool productivity for a given soil/rock type.

By way of further example, the central processor 72 may monitor the actual bend radius of a drill string 86 during a boring operation and compare the actual drill string bend radius to a maximum allowable bend radius specified for the particular drill string 86 in use or the product being installed. The machine controller 74 may alter boring machine operation and, in addition or in the alternative, the central processor 72 may compute an alternative bore path to ensure compliance with the maximum allowable bend radius requirements of the drill string in use or the product being installed.

The central processor 72 may monitor the actual drill string/product bend radius and compare same to the pre-planned path and steering plan, and adapt future control signals to accommodate any limitations in the steerability of the soil/rock strata. Additionally, the central processor 72 may monitor the actual bend radius, steerability factor, geophysical data, and other data to predict the amount of bore path straightening that will occur during the backreaming operation. Predicted bore path straightening, backreamer diameter, bore path length, type/weight of product being installed, and desired utility/obstacle safety clearance may be used to make alterations to the pre-planned bore path. This information may also be used when planning a bore path on-the-fly, in order to reduce the risk of striking utilities/obstacles while backreaming.

The central processor 72 may also receive and process data transmitted from one or more boring tool sensors. Orientation, pressure, and temperature information, for example, may be sensed by appropriate sensors provided in the boring tool 81, such as a strain gauge for sensing pressure. Such information may be encoded on the signal transmitted from the boring tool 81, such as by modulating the boring tool signal with an information signal, or transmitted as an information signal separate from the boring tool signal. When received by the central processor 72, an encoded boring tool signal is decoded to extract the information signal content from the boring tool signal content. The central processor 72 may modify boring system operations if such is desired or required in response to the sensor information.

It is to be understood that the central processor 72 depicted in FIG. 30 and the other figures may, but need not, be implemented as a single processor, computer or device. The functions performed by the central processor 72 may be performed by multiple or distributed processors, and/or any number of circuits or other electronic devices. All or some of the functions associated with the central processor may be performed from a remotely located processing facility, such as a remote facility which controls the boring machine operations via a satellite or other high-speed communications link. By way of further example, the functionality associated with some or all of the machine controller 74, automated drill mode routines 71, trajectory routines 69, bore plan development software/database 78, geophysical data interface 82, user interface 84, and display 85 may be incorporated as part of the central processor 72.

With continued reference to FIG. 30, a user interface 84 provides for interaction between an operator and the boring machine 70. The user interface 84 includes various manually-operable controls, gauges, readouts, and displays to effect communication of information and instructions between the operator and the boring machine 70. As is shown in FIG. 30, the user interface 84 may include a display 85, such as a liquid crystal display (LCD) or active matrix display, alphanumeric display or cathode ray tube-type display (e.g., emissive display), for example.

The user interface 84 may further include a Web/Internet interface for communicating data, files, email, and the like between the boring machine and Internet users/sites, such as a central control site or remote maintenance facility. Diagnostic and/or performance data, for example, may be analyzed from a remote site or downloaded to the remote site via the Web/internet interface. Software updates, by way of further example, may be transferred to the boring machine or boring tool electronics package from a remote site via the Web/internet interface. It is understood that a secured (e.g., non-public) communication link may also be employed to effect communications between a remote site and the boring machine/boring tool.

The portion of display 85 shown in FIG. 30 includes a display 79 which visually communicates information concerning a pre-planned boring route, such as a bore plan currently in use or one of several alternative bore plans developed or under development for a particular site. During or subsequent to a boring operation, information concerning the actual boring route is graphically presented on the display 77. When used during a boring operation, an operator may view both the pre-planned boring route display 79 and actual boring route display 77 to assess the progress and accuracy of the boring operation. Deviations in the actual boring route, whether user initiated or central processor initiated, may be highlighted or otherwise accentuated on the actual boring route display 77 to visually alert the operator of such deviations. An audible alert signal may also be generated.

It is understood that the display of an actual bore path and/or an on-the-fly adjusted bore path may be superimposed over a pre-planned bore path and displayed on the same display, rather than on individual displays. Further, the displays 77 and 79 may constitute two display windows of a single physical display. It is also understood that any type of view may be generated as needed, such as a top, side or perspective view, such as a view with respect to the drill or the tip of the boring tool, or an oblique, isometric, or orthographic view, for example.

It can be appreciated that the data displayed on the pre-planned and actual boring route displays 79 and 77 may be used to construct an "as-built" bore path data set and a path deviation data set reflective of deviations between the pre-planned and actual bore paths. The as-built data typically includes data concerning the actual bore path in three dimensions (e.g., x-, y-, z-planes), entrance and exit pit locations, diameter of the pilot borehole and backreamed borehole, all obstacles, including those detected previously to or during the boring operation, water regions, and other related data. Geophysical/geological data gathered prior, during or subsequent to the boring operation may also be included as part of the as-built data.

Turning now to FIG. 31, a bore plan database/software facility 78, such as that previously described, may be accessed by or incorporated into the central processor 72 for purposes of establishing a bore plan, storing a bore plan, and accessing a bore plan during a boring operation. A user, such as a bore plan designer or boring machine operator, may access the bore plan database 78 via a user interface 84. In a configuration in which the central processor 72 cooperates with a computer external to the boring machine, such as a personal computer, the user interface 84 typically comprises a user input device (e.g., keyboard, mouse, etc.) and a display. In a configuration in which the central processor 72 is used to execute the bore plan algorithms or interact with the bore plan database 78, the user interface 84 comprises a user input device and display provided on the boring machine or as part of the central processor housing.

A bore plan may be designed, evaluated, and modified efficiently and accurately using bore plan development software executed by the central processor 72. Alternatively, a bore plan may be developed using a computer system independent of the boring machine and subsequently uploaded to the bore plan database 78 for execution and/or modification by the central processor 72. Once established, a bore plan stored in the bore plan database 78 may be accessed by the central processor 72 for use during a boring operation.

In a further embodiment, a pre-established bore plan may be dynamically modified during a boring operation upon detection of an unknown obstacle or upon boring through soil/rock which significantly degrades the steering and/or excavation capabilities of the boring tool. Upon detecting either of these conditions, the central processor 72, if enabled to do so, attempts to compute a "best fit" alternative bore path "on-the-fly" that passes as closely as possible to subsequent targets. Detection of an unidentified or unknown obstruction is communicated to the operator, as well as a message that an alternative bore plan may be computed, automatically or in response to a user input to initiate the computation. If the alternative bore plan is determined valid, then the boring tool is advanced uninterrupted along the newly computed alternative bore path. If a valid alternative bore path cannot be computed, the central processor 72 halts the boring operation and communicates an appropriate warning message to the operator.

During a boring operation, as was discussed previously, bore plan data stored in the bore plan database 78 may be accessed by the central processor 72 to determine whether an actual bore path is accurately tracking the planned bore path. Real-time course corrections may be made by the machine controller 74 upon detecting a deviation between the planned and actual bore paths. The actual boring tool location may be displayed for comparison against a display of the preplanned boring tool location, such as on the actual and pre-panned boring route displays 77 and 79 shown in FIG. 30. As-built data concerning the actual bore path may be entered manually or automatically from data downloaded directly from a tracker unit, such as from the tracker unit 83 shown in FIG. 30. Alternatively, as-built data concerning the actual bore path may be constructed based on the trajectory information received from the navigation electronics 89 provided at the boring tool 81.

FIG. 32 is a block diagram of a system 100 for controlling, in real-time, various operations of a boring machine and a boring tool which incorporates a down-hole sensor unit according to an embodiment of the present invention. With respect to control loop $L_A$, the to system 100 includes an interface 73 that permits the system 100 to accommodate different types of sensor packages 89, including packages that incorporate magnetometers, accelerometer rate sensors, gyroscopes, various boring tool geophysical/environmental instruments and sensors, and telemetry methodologies.

The interface 73 may comprise both hardware and software elements that may be modified, either adaptively or manually, to provide compatibility between the boring tool sensor and communications components and the central processor components of the boring system 100. In one embodiment, the interface 73 may be adaptively configured to accommodate the mechanical, electrical, and data communication specifications of the boring tool electronics. In this regard, the interface 73 eliminates or significantly reduces technology dependencies that may otherwise require a multiplicity of specialized interfaces for accommodating a corresponding multiplicity of boring tool configurations.

With respect to control loop $L_B$, an interface 75 permits the system 100 to accommodate different types of locator and tracking systems, walkover units, boring tool geophysical/environmental instruments and sensors, and telemetry methodologies. Like the interface 73 associated with control loop $L_A$, the interface 75 may comprise both hardware and software elements that may be modified, either adaptively or manually, to provide compatibility between the tracker unit/boring tool components and the central processor components of the boring system 100. The interface 75 may be adaptively configured to accommodate the mechanical, electrical, and data communication specifications of the tracker unit and/or boring tool electronics.

In accordance with another embodiment, the central processor 72 is shown coupled to a transceiver 110 and several other sensors and devices via the interface 75 so as to define an optional control loop, $L_B$. According to this alternative embodiment, the transceiver 110 receives telemetry from the tracker unit 83 and communicates this information to the central processor 72. The transceiver 110 may also communicate signals from the central processor 72 or other process of system 100 to the tracker unit 83, such as boring tool configuration commands, diagnostic polling commands, software download commands and the like. In accordance with one less-complex embodiment, transceiver 110 may be replaced by a receiver capable of receiving, but not transmitting, data.

Using the telemetry data received from the down-hole sensor unit 89 at the boring tool 81 and, if desired, drill string displacement data, the central processor 72 computes the range and position of the boring tool 81 relative to a ground level or other pre-established reference location. The central processor 72 may also compute the absolute position and elevation of the boring tool 81, such as by use of known GPS-like techniques. Using the boring tool telemetry data received from the tracker unit 83, the central processor 72 also computes one or more of the pitch, yaw, and roll (p, y, r) of the boring tool 81.

Depth of the boring tool may also be determined based on the strength of an electromagnetic sonde signal transmitted from the boring tool. It is noted that pitch, yaw, and roll may also be computed by the down-hole sensor unit 89, alone or in cooperation with the central processor 72. Suitable techniques for determining the position and/or orientation of the boring tool 81 may involve the reception of a sonde-type telemetry signal (e.g., radio frequency (RF), magnetic, or acoustic signal) transmitted from the down-hole sensor unit 89 of the boring tool 81.

The down-hole sensor unit 89 may include a variety of sensors and on-board signal processing capabilities. For example, the sensor unit 89 may include one or more inertial navigation sensors, and may further include magnetometers and other sensors. Such sensors may be fabricated using conventional processing techniques or advanced techniques, such as a Micro Electrical Mechanical Systems (EMS) or other micromachining or photolithographic technique. The central processor 72 may receive telemetry data from the sensor unit 89 in electromagnetic, optical, acoustic, or mud pulse signal form, for example. Other types of signal forms or combination of signal forms may also be communicated between the boring tool and the controller.

In accordance with one embodiment, a mobile tracker apparatus 83 may used to manually track and locate the progress of the boring tool 81 which is equipped with a transmitter that generates a sonde signal. The tracker 83, in cooperation with the central processor 72, locates the relative and/or absolute location of the boring tool 81 and communicates this information to the bore planning facility of the underground boring machine. Examples of such known locator techniques are disclosed in U.S. Pat. Nos. 5,767,678; 5,764,062; 5,698,981; 5,633,589; 5,585,726; 5,469,155; 5,337,002; and 4,907,658; all of which are hereby incorporated herein by reference in their respective entireties. These systems and techniques may be advantageously adapted for inclusion in a real-time boring tool locating and bore planning approach consistent with the principles of the present invention.

Various techniques for determining the position and/or orientation of a boring tool and for characterizing subsurface geology are disclosed in commonly assigned U.S. Pat. Nos. 5,720,354 and 5,904,210, both of which are hereby incorporated herein by reference in their respective entireties. A radar unit provided as part of an aboveground tracker unit or in-situ the boring tool may implement a swept-step detection methodology as described in U.S. Pat. No. 5,867,117, which is hereby incorporated herein by reference in its entirety. Suitable radar IC's and detection methodologies are disclosed in U.S. Pat. Nos. 5,805,110; 5,774,091; and 5,757,320, which are hereby incorporated herein by reference in their respective entireties.

Various suitable micromechanical/micromachined and other types of resonant, oscillating, and vibratory gyroscopes, rate sensors, and magnetometers include those disclosed in U.S. Pat. Nos. 5,915,275; 5,869,760; 5,831,164; 5,818,227; 5,817,942; 5,796,001; 5,780,742; 5,767,405; 5,760,305; 5,756,895; 5,739,431; 5,668,319; 5,659,195; 5,656,777; 5,627,314; 5,515,724; 5,456,110; 5,392,650; 5,233,871; 5,188,983; 5,090,254; 4,945,765; and 4,598,585; all of which are hereby incorporated herein by reference in their respective entireties. Various suitable pressure sensors, which may be incorporated within the boring tool housing and cutting bits/surfaces, are disclosed in U.S. Pat. No. 5,886,249; 5,338,929; 5,332,469; 5,189,777; 4,996,627; and 4,926,696; all of which are hereby incorporated herein by reference in their respective entireties.

Exemplary methodologies for controlling the displacement and rotation of a boring tool which may be adapted for use in a closed-loop control approach consistent with the principles of the present invention are disclosed in commonly owned U.S. Pat. No. 5,746,278 and U.S Ser. Nos. 09/405,889 and 09/405,890 filed concurrently on Sep. 24, 1999 each of which is hereby incorporated herein by reference in its respective entirety.

A computer assisted method for designing a bore plan and interacting with a bore planning facility according to the present invention may thus be effected, for example, by a processor implementing a sequence of machine-readable instructions. These instructions may reside in various types of signal-bearing media. In this respect, another embodiment of the present invention concerns a programmed product which includes a signal-bearing medium embodying a program of machine-readable instructions, executable by a digital processor to perform method steps to effect the bore path planning and modification procedures of the present invention. The signal-bearing media may include, for example, random access memory (RAM) provided within, or otherwise coupled to, the processor.

Alternatively, the instructions may be contained in other signal-bearing media, such as one or more magnetic data storage diskettes, direct access data storage disks (e.g., a conventional hard drive or a RAID array), magnetic tape, alterable or non-alterable electronic read-only memory (e.g., EEPROM, ROM), flash memory, optical storage devices (e.g., CDROM or WORM), signal-bearing media including transmission media such as digital, analog, and communication links and wireless, and propagated signal media. In an illustrative embodiment, the machine-readable instructions may constitute lines of compiled "C" language code or "C++" object-oriented code.

It will, of course, be understood that various modifications and additions can be made to the preferred embodiments discussed hereinabove without departing from the scope of the present invention. Accordingly, the scope of the present invention should not be limited by the particular embodiments described above, but should be defined only by the claim's set forth below and equivalents thereof.

What is claimed is:

1. A method for electronically developing a bore plan of a bore site for use in connection with an underground boring machine, comprising
    receiving topographical information representative of topography of the bore site;
    receiving utility information representative of one or more utilities situated at the bore site;
    receiving bore path information representative of an intended bore path for the bore site, the bore path information comprising two or more target points through which the intended bore path is to pass, each of the target points defined by a distance value, left/right value, and a depth value; and
    generating bore plan data using the received topographic, utility, and bore path information, the bore plan data comprising data representative of an intended bore defined along the intended bore path and with respect to the representative topography of the bore site, the bore plan data further comprising an entry point at which the intended bore path begins and an exit point at which the intended bore path terminates.

2. The method of claim 1, further comprising receiving product information concerning a product to be installed in the intended bore, wherein the bore plan data is generated using the received topographic, utility, bore path, and product information.

3. The method of claim 2, wherein the product information comprises one or more of a diameter, allowable bend radius, and quantity of the product to be installed in the intended bore.

4. The method of claim 2, further comprising receiving ground cover information concerning ground cover above the installed product.

5. The method of claim 1, further comprising receiving drill rod information concerning a drill rod to be used to produce an actual bore at the bore site, wherein the bore plan data is generated using the received topographic, utility, bore path, and drill rod information.

6. The method of claim 5, further comprising receiving ground cover information concerning ground cover above the installed product, wherein the ground cover information is defined with respect to length along the drill rod.

7. The method of claim 1, wherein the topographical information comprises information for defining a surface of earth at the bore site, the method further comprising receiving surface feature information representative of one or more features defined on the earth's surface at the bore site.

8. The method of claim 7, wherein the surface feature information comprises information representative of surface water at the bore site.

9. The method of claim 7, wherein the surface feature information comprises information representative of a man-made or natural obstacle, structure or pathway.

10. The method of claim 1, wherein the topographical information comprises information representative of a height of a surface of earth at the bore site above the intended bore path.

11. The method of claim 10, wherein the height of the earth's surface at the bore site above the intended bore path is defined relative to a pre-established reference of the bore site.

12. The method of claim 11, wherein the pre-established reference of the bore site is defined in terms of a latitude, longitude, and altitude.

13. The method of claim 1, further comprising receiving machine information concerning the underground boring machine to be used to produce an actual bore at the bore site.

14. The method of claim 13, wherein the machine information comprises one or more of drill rod radius information, drill rod bend radius information, and type of underground boring machine to be used to produce an actual bore at the bore site, further wherein the bore plan data is generated using the received topographic, utility, bore path, and some or all of the machine information.

15. The method of claim 1, wherein each of the target points is defined by a distance value, left/right value, a depth value, and a pitch value.

16. The method of claim 1, wherein each of the target points is defined by a distance value, left/right value, a depth value, and an azimuth value.

17. The method of claim 1, wherein the utility information comprises information concerning one or more of a gas, water, sewer, communications or electrical utility to be avoided by the intended bore path.

18. The method of claim 1, wherein receiving the utility information comprises receiving location information of at least two points of each of the utilities situated at the bore site.

19. The method of claim 1, wherein receiving the utility information comprises receiving information identifying each of the utilities situated at the bore site as an intersecting utility or a non-intersecting utility, an intersecting utility defining a utility that is expected to pass under or over the intended bore path and a non-intersecting utility defining a utility that is not expected to pass under or over the intended bore path.

20. The method of claim 19, wherein the utility information comprises information identifying one or both of a first end and a second end of each utility, and further comprises pot hole information of each utility.

21. A method for electronically developing a bore plan of a bore site for use in connection with an underground boring machine, comprising
    displaying a topography input window that receives topographic input data from a user;
    displaying a utilities input window that receives utility input data from the user;
    displaying a bore path input window that receives bore path input data from the user, the bore path input data comprising two or more target points each defined by a distance value, left/right value, and a depth value; and displaying a graphical representation of the bore plan comprising graphical representations of each utility and a bore path presented within a topographic representation of the bore site, the graphical representation of the bore path comprising graphical representations of an entry point, the two or more target points, and an exit point.

22. The method of claim 21, wherein the graphical representation of the bore plan has a three-dimensional effect.

23. The method of claim 21, wherein the graphical representation of the bore plan is defined relative to a bore site reference.

24. The method of claim 21, wherein displaying the topography input window comprises displaying a distance field, a height field, and an optional left/right field for receiving from the user distance, height, and optional left/right input data for each of one or more topographic points.

25. The method of claim 21, wherein displaying the utilities input window comprises displaying at least one location window and a pot hole window for receiving from the user location and pot hole input data for each of one or more utilities.

26. The method of claim 21, wherein displaying the utilities input window comprises displaying an intersecting field and a non-intersecting field for specifying by the user whether a utility is an intersecting utility or a non-intersecting utility, an intersecting utility defining a utility that is expected to pass under or over the bore path and a non-intersecting utility defining a utility that is not expected to pass under or over the bore path.

27. The method of claim 21, wherein displaying the utilities input window comprises displaying a diameter field and a minimum clearance field for receiving from the user diameter and minimum clearance data for each of one or more utilities, the diameter data indicating a diameter of the utility and the minimum clearance data indicating a clearance defined around each utility through which the bore path is not permitted to pass.

28. The method of claim 21, wherein displaying the bore path input window comprises displaying a target window for receiving from the user location data for each of the two or more targets through which the bore path is to pass.

29. The method of claim 21, wherein displaying the bore path input window comprises displaying a pitch field for receiving from the user pitch data for each of the two or more targets through which the bore path is to pass.

30. The method of claim 21, wherein displaying the bore path input window comprises displaying an azimuth field for receiving from the user azimuth data for each of the two or more targets through which the bore path passes.

31. The method of claim 21, wherein displaying the bore path input window comprises displaying a grade window for receiving from the user grade data defining a grade through which the bore path is to pass.

32. The method of claim 21, further comprising altering one or more of the topographic input data, utility input data or bore path input data.

33. The method of claim 21, further comprising altering the graphical representations of a selected utility, topographic or bore path element in response to a user input command.

34. The method of claim 33, further comprising displaying data corresponding to the selected utility, topographic or bore path element while graphically altering the graphical representation of the selected utility, topographic or bore path element.

35. The method of claim 21, further comprising displaying a selected one of a bore plan report or graph, a minimum ground cover report or graph, a sonde information report or graph, or a warnings/errors report or graph.

36. The method of claim 21, further comprising displaying a drill rod selection window that receives drill rod input data from the user, the drill rod selection window providing minput windows for receiving dill rod input data defining one or more of rod diameter, individual rod length, rod bend radius, and entry point offset.

37. The method of claim 21, further comprising displaying a product selection window that receives product input data from the user, the product selection window providing an input window for receiving product input data defining one or both of product diameter and product quantity.

38. The method of claim 21, further comprising displaying a diameter selection window that receives diameter input data from the user, the diameter selection window providing an input window for receiving input data defining one or both of a backreamer diameter and a pilot bit diameter.

39. The method of claim 21, further comprising displaying a machine selection window that receives machine input data from the user, the machine input data defining one of a plurality of underground boring machines selectable by the user.

40. The method of claim 21, further comprising displaying an entry angle selection window that receives entry angle input data from the user, the entry angle input data defining a drill rack angle with respect to the horizon associated with a selected underground boring machine.

41. A method of electronically computing a bore plan of a bore site for use in connection with an underground boring machine, comprising:
providing target parameters defining an entry point, an exit point, and each of a plurality of target points along an intended bore path, the target parameters comprising a distance value, left/right value, and a depth value;
providing utility parameters defining one or more utilities situated at the bore site;
providing a maximum bend radius parameter representative of a maximum bend radius of a specified drill rod to be used to produce an actual bore at the bore site; and
calculating a bore that connects with each of the entry, target, and exit points, avoids passing through the utilities, and avoids exceeding a maximum bend radius of the specified drill rod using the target, utility, and maximum bend radius parameters.

42. The method of claim 41, wherein providing the utility parameters comprises providing parameters defining a safety clearance region for each of the utilities, and calculating the bore further comprises calculating the bore such that the bore avoids passing through the safety clearance region of each of the utilities using the safety clearance region parameters.

43. The method of claim 41, wherein providing the utility parameters comprises providing utility parameters that define at least one point of each utility in three-dimensions.

44. The method of claim 41, wherein providing the utility parameters comprises providing a distance, left/right, and depth parameter for at least one point of each utility.

45. The method of claim 41, wherein providing the utility parameters comprises providing utility parameters defining one or both of a first end and a second end of each utility, and further comprises providing utility parameters defining pot hole parameters of each utility, the pot hole parameters indicating a point where the bore crosses under or over the utility.

46. The method of claim 41, wherein providing the target parameters further comprises manually providing the target parameters associated with one or both of the entry and exit points.

47. The method of claim 41, wherein providing the target parameters further comprises automatically providing the target parameters associated with one or both of the entry and exit points.

48. The method of claim 41, wherein providing the target parameters comprises providing one or both of a pitch and an azimuth for each target point.

49. The method of claim 41, further comprising manually specifying or automatically calculating one or both of the entry point and the exit point.

50. The method of claim 41, wherein calculating the bore further comprises:

incrementally displacing the bore a specified distance from a particular target point to an adjacent target point; and at each displacement increment, calculating a direction that moves the bore toward the adjacent target point.

51. The method of claim 41, wherein calculating the bore further comprises calculating one or more control points to connect the bore between a particular target point and an adjacent target point.

52. The method of claim 51, wherein each control point defines a point which is co-planar with respect to the particular and adjacent target points and is co-planar with respect to a direction angle of the adjacent target point.

53. The method of claim 52, wherein a region is defined for the adjacent target point which represents a limit of the specified drill rod's ability to bend as a function of the maximum bend radius of the specified drill rod, further wherein each control point defines a point which is co-planar with respect to the particular and adjacent target points, is co-planar with respect to a direction angle of the adjacent target point, and, when connected with the particular target point, tangentially intersects the region by a predetermined allowable bore length.

54. The method of claim 41, wherein calculating the bore further comprises calculating a largest allowable drill string bend radius which connects the bore between a particular target point and an adjacent target point.

55. The method of claim 41, wherein calculating the bore further comprises calculating one or more segments which connect the bore between a particular target point and an adjacent target point.

56. A system for electronically developing a bore plan of a bore site for use in connection with an underground boring machine, comprising:

a processor;

memory coupled to the processor;

an input device, coupled to the processor, for inputting topographical information representative of topography at the bore site, utility information representative of one or more utilities situated at the bore site, and bore path information representative of an intended bore path at the bore site, the bore path information comprising two or more targets through which the intended bore path is to pass, each of the two or more targets defined by a distance value, left/right value, and a depth value; and a display device coupled to the processor, the processor computing bore plan data using the topographic, utility, and bore path information, the bore plan data presented in textual and/or graphical form on the display as data representative of an intended bore, including entry and exit points, defined along the intended bore path.

57. The system of claim 56, wherein the input device is operable by the user.

58. The system of claim 56, wherein the input device comprises a communications interface.

59. The system of claim 56, wherein the bore plan data is presented in graphical form on the display as data representative of the intended bore defined along the intended bore path and with respect to the representative topography of the bore site.

60. The system of claim 56, wherein the input device provides for inputting product information representative of one or more of a diameter, allowable bend radius, and quantity of the product to be installed along the bore path, the processor computing the bore plan data using the topographic, utility, bore path, and product information.

61. The system of claim 56, wherein the input device provides for inputting drill rod information representative of one or both of drill rod radius information and drill rod bend radius information, the processor computing the bore plan data using the topographic, utility, bore path, and drill rod information.

62. The system of claim 56, wherein the input device provides for inputting bore path information comprising pitch information concerning the two or more targets through which the intended bore path is to pass.

63. The system of claim 56, wherein the input device provides for inputting bore path information comprising azimuth information concerning the two or more targets through which the intended bore path is to pass.

64. The system of claim 56, wherein the input device provides for inputting utility information comprising at least two points of each of the utilities situated at the bore site.

65. The system of claim 56, wherein the processor alters one or more of the topographic information, utility information or bore path information.

66. The system of claim 56, wherein the processor alters graphical representations of a selected utility, topographic or bore path element presented on the display in response to a command received by the input device.

67. The system of claim 56, wherein the processor displays data corresponding to a selected utility, topographic or bore path element while graphically altering the graphical representation of the selected utility, topographic or bore path element.

68. The system of claim 56, further comprising an output device coupled to the processor, the output device generating a selected one of a bore plan report or graph, a minimum ground cover report or graph, a sonde information report or graph, or a warnings/errors report or graph.

69. A computer readable medium embodying program instructions for electronically developing a bore plan of a bore site for use in connection with an underground boring machine, comprising:

receiving topographical information representative of topography of the bore site;

receiving utility information representative of one or more utilities situated at the bore site;

receiving bore path information representative of an intended bore path at the bore site, the bore path information comprising two or more target points through which the intended bore path is to pass, each of the target points defined by a distance value, left/right value, and a depth value; and generating bore plan data using the received topographic, utility, and bore path information, the bore plan data comprising data representative of an intended bore defined along the intended bore path and with respect to the representative topography of the bore site, the bore plan data further comprising an entry point at which the intended bore path begins and an exit point at which the intended bore path terminates.

70. A computer readable medium embodying program instructions for electronically developing a bore plan of a bore site for use in connection with an underground boring machine, comprising:
    displaying a topography input window that receives topographic input data from a user;
    displaying a utilities input window that receives utility input data from the user;
    displaying a bore path input window that receives bore path input data from the user, the bore path input data comprising data defining a plurality of targets through which the intended bore path is to pass, the data defining each of the plurality of targets comprising a distance value, left/right value, and a depth value; and
    displaying a graphical representation of the bore plan comprising graphical representations of each utility and a bore path, including entry and exit locations, presented within a topographic representation of the bore site.

71. A computer readable medium embodying program instructions for electronically developing a bore plan of a bore site for use in connection with an underground boring machine, comprising:
    providing target parameters defining each of a plurality of target points along an intended bore path, the target parameters defining each of the plurality of target point comprising a distance value, left/right value, and a depth value;
    providing utility parameters defining one or more utilities situated at the bore site;
    providing a maximum bend radius parameter representative of a maximum bend radius of a specified drill rod to be used to produce an actual bore at the bore site: and
    calculating a bore that connects with each of the target points, avoids passing through the utilities, and avoids exceeding a maximum bend radius of the specified drill rod.

72. A method for electronically developing a bore plan of a bore site for use in connection with an underground boring machine, the boring machine comprising a cutting tool, the method comprising:
    receiving information defining mechanical properties of the boring machine;
    receiving information representative of an underground first location of the cutting tool;
    receiving information representative of an underground target point through which the cutting tool is to pass;
    receiving information representative of topography at the bore site;
    setting bore path limitations based on the received mechanical properties of the boring machine; and
    generating, using the received first location information and target point information, bore plan data that ensures that the bore path limitations are not violated.

73. The method of claim 72, wherein the mechanical properties of the boring machine comprise drill rod diameter and drill rod length.

74. The method of claim 72, wherein the bore path limitations comprise minimum allowable bend radius.

75. The method of claim 72, wherein the bore plan data comprises a depth, pitch, and azimuth value for points spaced apart by one rod length.

76. The method of claim 72, wherein the bore plan data comprises a suggested steering correction action for each drill rod coupled to the boring machine that maximizes the boring distance in which the bore path is straight.

77. The method of claim 72, wherein the method is implemented by a portable computing system.

78. The method of claim 72, wherein the method is implemented by a computing system separate from a computer of the boring machine.

79. The method of claim 72, wherein:
    the mechanical properties of the boring machine comprise a range of initial entry pitch angles that the boring machine is capable of achieving;
    the topography information comprises slope; and
    the information for the target point comprises depth;
    the depth for the first location is automatically set to zero; and
    generating the bore plan data comprises generating bore plan data that minimizes bore length, the bore plan data comprising information on how to set-up the boring machine to begin a bore and achieve desired parameters at the target point.

80. The method of claim 79, wherein a selected initial entry pitch angle is set and a distance between the first point and the target point is calculated to minimize bore path length.

81. The method of claim 79, wherein a distance between the first point and the target point is set and a computed initial entry pitch angle is calculated.

82. The method of claim 79, wherein a computed initial entry pitch angle and a distance between the first point and the target point are respectively calculated to minimize bore path length.

83. The method of claim 72, wherein:
    the topography information comprises slope;
    the information for the first point comprises depth and pitch;
    the depth for the target point is automatically set to zero; and
    generating the bore plan data comprises generating bore plan data that minimizes bore length, the bore plan data comprising information on a distance between the first point and the target point where depth is zero, the target point defining an exit point.

84. The method of claim 83, wherein a pitch at the target point is set and the distance between the first point and the target point is calculated to minimize the bore path length.

85. The method of claim 83, wherein the distance between the first point and the target point is set and a pitch at the target point is calculated to minimize the bore path length.

86. The method of claim 83, wherein the distance between the first point and the target point and the pitch at the target point are respectively calculated to minimize the bore path length.

87. A method for electronically developing a bore plan of a bore site for use in connection with an underground boring machine, comprising
    receiving information defining mechanical properties of the boring machine to be used at the bore site;
    receiving information representative of the bore hole size; and
    generating bore plan data using the received information representative of the bore hole size.

88. The method of claim 87, wherein the mechanical properties of the boring machine comprise mud pumping capacity.

89. The method of claim 87, wherein the bore plan data comprises maximum pull-back rate.

90. The method of claim 87, wherein the bore plan data comprises total volume of mud required.

91. The method of claim 87, wherein the received information representative of the bore hole size comprises diameters of one or more of a product to be installed, a backreamer, and a boring tool.

92. The method of claim 91, wherein generating the bore plan data comprises generating the bore plan data using a largest diameter of the diameters of the one or more of the product to be Installed, backreamer, and boring tool.

93. The method of claim 1, wherein one or both of the entry point and the exit point is manually established.

94. The method of claim 1, wherein one or both of the entry point and the exit point is automatically established.

* * * * *